United States Patent
Kato et al.

(10) Patent No.: US 9,307,772 B2
(45) Date of Patent: Apr. 12, 2016

(54) METHOD AND AN APPARATUS FOR FORMING A FOOD PRODUCT INTO A CIRCULAR SHAPE

(75) Inventors: Akihiko Kato, Utsunomiya (JP);
Hitoshi Kuwabara, Utsunomiya (JP);
Takao Takagi, Utsunomiya (JP);
Nobuaki Harada, Utsunomiya (JP);
Noritake Fukuda, Utsunomiya (JP)

(73) Assignee: RHEON AUTOMATIC MACHINERY CO., LTD., Tochigi (JP)

( * ) Notice: Subject to any disclaimer, the term of this patent is extended or adjusted under 35 U.S.C. 154(b) by 347 days.

(21) Appl. No.: 14/122,755

(22) PCT Filed: May 25, 2012

(86) PCT No.: PCT/JP2012/063501
§ 371 (c)(1),
(2), (4) Date: Feb. 7, 2014

(87) PCT Pub. No.: WO2012/165335
PCT Pub. Date: Dec. 6, 2012

(65) Prior Publication Data
US 2014/0186506 A1 Jul. 3, 2014

(30) Foreign Application Priority Data

Jun. 2, 2011 (JP) ................................. 2011-124274

(51) Int. Cl.
*A21C 11/00* (2006.01)
*A21D 8/02* (2006.01)
*A21C 9/08* (2006.01)
*A21C 3/06* (2006.01)

(52) U.S. Cl.
CPC ............... *A21C 11/002* (2013.01); *A21C 9/088* (2013.01); *A21D 8/02* (2013.01); *A21C 3/06* (2013.01); *A21C 9/085* (2013.01)

(58) Field of Classification Search
CPC ........ A21C 11/002; A21C 11/00; A21C 3/06; A21C 9/088; A21C 9/085; A21D 8/02; A01B 12/006
USPC .......... 426/500, 503, 517, 518; 425/374, 323, 425/296, 305.1, 322, 334, 392
See application file for complete search history.

(56) References Cited

U.S. PATENT DOCUMENTS

| | | | |
|---|---|---|---|
| 1,739,892 A | 12/1929 | Elliott | |
| 1,949,105 A * | 2/1934 | Lauterbur | A21C 3/02 425/404 |
| 4,961,697 A | 10/1990 | De Fockert et al. | |
| 5,382,154 A | 1/1995 | Morikawa et al. | |
| 6,036,990 A * | 3/2000 | Shlyakhovsky | A21C 3/08 425/319 |
| 2010/0104719 A1* | 4/2010 | Okaizumi | A21C 11/002 426/500 |
| 2010/0151093 A1* | 6/2010 | Wilk | A21C 9/088 426/281 |
| 2012/0294964 A1* | 11/2012 | Piller | A21C 9/085 425/150 |
| 2015/0351414 A1* | 12/2015 | Borland | A21C 3/06 426/549 |

FOREIGN PATENT DOCUMENTS

| | | | |
|---|---|---|---|
| EP | 2 143 332 | 1/2010 | |
| FR | 2532819 A1 * | 3/1984 | A21C 3/02 |
| JP | 2670597 B2 | 10/1997 | |
| JP | 2010-148474 A | 7/2010 | |
| JP | 2012-44886 A | 3/2012 | |

OTHER PUBLICATIONS

International Search Report of PCT/JP2012/063501 dated Aug. 28, 2012.
European Search Report issued Feb. 17, 2015 in European Patent Application No. 12792013.0.

* cited by examiner

*Primary Examiner* — Steven Leff
(74) *Attorney, Agent, or Firm* — Sughrue Mion, PLLC

(57) ABSTRACT

A method for forming a food product into a circular shape, wherein both ends of an elongated food product are connected each other and closed, or into a C-shape, wherein both ends of the elongated food product face each other and opened. The method includes (a) fixing one end of the elongated food product to a rotatable core member, (b) pressing the food product toward the core member by moving the core member close to and away from a pressing roller, when the food product is formed into a circular shape by being wound around the core member by rotating the core member, and (c) separating the formed food product and the core member by releasing the food product from the core member, after forming the food product 3 into a required shape by being wound around the core member.

11 Claims, 27 Drawing Sheets

(A)

(B)

(A)

(B)

(A)

(B)

(A)

(B)

(A)

(B)

(A)

(B)

(A)

(B)

(A)

(B)

(A)

(B)

Detailed Drawing of Fig. 16(A)

View F

Detailed Drawing of Fig. 16(C)

Detailed Drawing of Fig. 16(E)

View I-I (A)

Plain View (B)

(A)

Plain View (B)

Direction for conveying food products 3

Upper surface of a conveyer 105

(A)

Plain View (B)

(A)

Plain View (B)

(A)

(B)

Upper surface of a conveyer 105

Direction for conveying food products 3

(A)

(B)

Upper surface of a conveyer 105

Direction for conveying food products 3

METHOD AND AN APPARATUS FOR FORMING A FOOD PRODUCT INTO A CIRCULAR SHAPE

CROSS REFERENCE TO RELATED APPLICATIONS

This is a National Stage of International Application No. PCT/JP2012/063501 filed May 25, 2012, claiming priority based on Patent Japanese Application No. 2011-124274 filed Jun. 2, 2011, the contents of all of which are incorporated herein by reference in their entirety.

TECHNICAL FIELD

The inventions relate to a method and an apparatus for forming a food product (food dough), which have a linear and elongated shape (a long shape), into a circular shape, wherein both ends of an elongated food product are connected each other and closed, or into a C-shape, wherein both ends of the elongated food product face each other and opened.

Particularly, they relate to a method and an apparatus for forming a food product into a circular shape by bending the elongated food product sequentially from one end to the other end of the food product.

BACKGROUND OF THE INVENTIONS

Conventionally, when croissants are produced, a food dough sheet that is cut into a triangular shape is rolled up from the base of the triangular shape so that the food dough is formed into a linear and elongated shape having a thick diameter at its central part. Then, the rolled food dough is bent so that the central part of the rolled food dough in a longitudinal direction becomes a center, and so that both ends of the rolled food dough come close each other. Consequently, the rolled food dough is formed into a circular shape so that the food product is formed into a circular shape, wherein both ends of the formed food product are connected and closed, or into a C-shape, wherein both ends of the elongated food product face each other and opened. (See Patent Document 1.)

Patent Document 1: Japanese Patent Laid-open Publication No. 2010-148474

SUMMARY OF THE INVENTIONS

In the invention disclosed in Patent Document 1, when a center pin contacts with the central part in the longitudinal direction of the elongated food dough, such as croissants, a pressing roller bends one side of the elongated food dough sequentially from its central part to its end along the outer surface of the center pin, then, in the same manner the pressing roller also bends the other side of the elongated food dough along the outer surface of the center pin. Thus, the elongated food dough can be well formed by bending it along the outer surface of the center pin.

However, in the invention disclosed in Patent Document 1, when one side of the elongated food dough is bent along the outer surface of the center pin, since the one side of the elongated food dough is formed by bending it sequentially from its central part in a longitudinal direction to its end, and thereafter the other side of the elongated food dough is also formed by bending it sequentially from its central part in the longitudinal direction to its end. Thus, the pressing roller must return to its central part after the one side is formed. Thus, to increase productivity for forming the elongated food dough, it is required to improve the forming processes.

Further, depending on characteristics of the food dough, while the other side of it is being bent after one side was bent, the already bent side of it happens to deform from the bent shape. Thus, when both ends of the formed food dough are to be overlapped and to be adhered each other, it could be a problem that it is difficult to overlap both ends of the formed food dough.

The present inventions address the aforementioned conventional problems and have the following technical features:

a method for forming a food product into a circular shape, wherein both ends of an elongated food product are connected each other and closed, or into a C-shape, wherein both ends of the elongated food product face each other and opened, wherein the method comprising:

(a) a step for fixing one end of the elongated food product to a rotatable core member;

(b) a step for pressing the food product toward the core member by moving the core member closer to and away from a pressing roller, when the food product is formed into a circular shape by being wound around the core member by rotating the core member; and (c) a step for separating the formed food product and the core member by releasing the food product from the core member, after forming the food product into a required shape by winding the food product around the core member.

Further, the present inventions have the following technical features:

a method for forming a food product into a circular shape, wherein both ends of an elongated food product are connected each other and closed, or into a C-shape, wherein both ends of the elongated food product face each other and opened, wherein the method comprising:

(a) a step for fixing one end of the elongated food product to a rotatable core member;

(b) a step for pressing the food product toward the core member by moving a pressing roller closer to and away from the core member, when the food product is formed into a circular shape by being wound around the core member by rotating the core member; and (c) a step for separating the formed food product and the core member by releasing the food product from the core member, after forming the food product into a required shape by winding the food product around the core member.

Further, in the methods explained in the above paragraphs, the methods further comprise:

a step for overlapping both ends of the food product to connect both ends and to close the food product into a circular shape; and a step for adhering the overlapped both ends of the food product by pinching the overlapped both ends of the food product with the core member and the pressing roller.

Further, in the methods explained in the above paragraphs, the step for separating the formed food product from the core member further comprises:

a step for blowing air between the surface of the inner side of the food product and the outer surface of the core member.

Further, an apparatus for forming a food product into a circular shape, wherein both ends of an elongated food product are connected each other and closed, or into a C-shape, wherein both ends of the elongated food product face each other and opened, wherein the apparatus comprising:

a rotatable core member having a fixing means for fixing one end of the elongated food product to the outer surface of the core member; and a pressing roller for pressing the food product toward the core member by moving the core member close to and away from the pressing roller, when the food product is formed into a circular shape by being wound around the core member by rotating the core member.

Further, in the apparatus explained in the above paragraph, the pressing roller is disposed above and close to a conveyer that conveys the food products in lines.

Further, an apparatus for forming a food product into a circular shape, wherein both ends of an elongated food product are connected each other and closed, or into a C-shape, wherein both ends of the elongated food product face each other and opened, wherein the apparatus comprising:

a rotatable core member having a fixing means for fixing one end of the elongated food product to the part of the outer surface of the core member, and a pressing roller for pressing the food product toward the core member by moving the pressing roller closer to and away from the core member, when the food product is formed into a circular shape by being wound around the core member by rotating the core member.

Further, in the apparatus explained in the above paragraph, the apparatus further comprises:

a holding roller for preventing the food product from being lifted, when the food product is formed into a circular shape by being wound around the core member, and by being pressed toward the core member with the pressing roller.

Further, in the apparatuses explained in the above paragraphs, the pressing roller is forcibly rotated, when the food product is formed into a circular shape by being wound around the core member, and by being pressed toward the core member with the pressing roller.

Further, in the apparatuses explained in the above paragraphs, the fixing means has a holding member that can press one end of the food product toward the core member, and ascend and descend relative to the core member.

Further, in the apparatuses explained in the above paragraphs, the apparatuses further comprise:

a means for ejecting air between the surface of the inner side of the food product and the outer surface of the core member, when the formed food product is separated from the core member.

Effects of the Inventions

Since these inventions can form the food products into a circular shape by winding the food products having an elongated shape sequentially from one end to the other end of the food products, the elongated food products can be efficiently formed into a circular shape.

Even if the length of each food product slightly differs from each other, the food products can be successfully formed into a circular shape. Thus, the productivity for forming the elongated food products into a circular shape can be increased.

BRIEF DESCRIPTION OF THE DRAWINGS

FIGS. 16-1, 16-2, and 16-3 show detailed drawings of FIGS. 16(A), 16(C), and 16(E), respectively.

PREFERRED EMBODIMENTS OF THE INVENTIONS

First, the first embodiment of the present inventions is explained based on drawings.

An apparatus 1 for forming a food product into a circular shape of the first embodiment forms a food product 3 into a circular shape by active movements of a core member 43 and by passive movements of a pressing roller 29, as described below.

Figure 1:
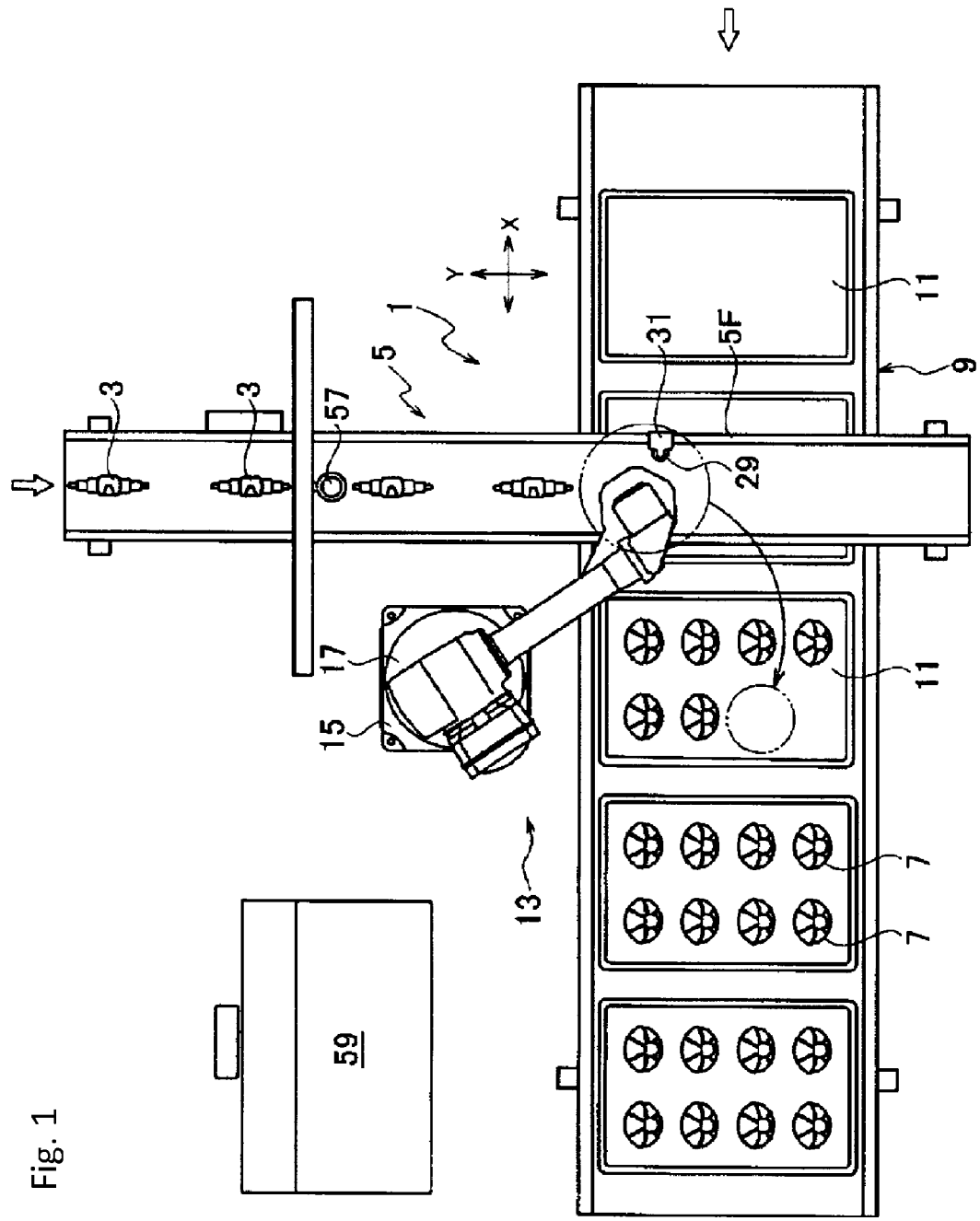
FIG. 1 is a plain view showing a whole configuration of an apparatus of the first embodiment for forming a food product into a circular shape of the present inventions.

As shown in FIG. 1, the apparatus 1 of the first embodiment includes a conveyer 5 for conveying in a row the food products 3 (food dough), which have a linear and elongated shape (long shape).

For example, the food products 3 in this embodiment are croissants, which are formed linearly by rolling a food dough sheet, which is cut into a triangular shape, from the base of the triangular to the top. These croissants have an elongated shape and a thick diameter at its central part in the longitudinal direction.

In addition, in this embodiment, the linear and elongated food products 3 are not limited to croissants. The food products 3 other than croissants can be processed by the apparatus 1 of this embodiment of the inventions.

For example, the conveyer 5 in this embodiment is a belt conveyer. The belt conveyer of this type is to be rotationally driven by controlling rotations of a control motor (not shown). A carrying-out conveyer 9 for carrying out formed food products 7 to the following process is disposed near the downstream end of the conveyer 5. In this embodiment, it is exemplified that the carrying-out conveyer 9 conveys trays 11 on which the formed food products 7 are placed. However, the carrying-out conveyer 9 may convey the formed food products 7 by directly placing them on the carrying-out conveyer 9. Further, in this embodiment, it is exemplified that the carrying-out conveyer 9 is disposed so as to intersect with the conveyer 5. However, the carrying-out conveyer 9 may be disposed parallel to or in series with the conveyer 5. Since the carrying-out conveyer 9 has a well-known configuration, a detailed explanation of it is omitted.

A means 13 for forming and carrying food products, which forms the food products 3 conveyed by the conveyer 5 into a circular shape and carries the formed food products 7 onto the trays 11, is disposed near the conveyer 5 and the carrying-out conveyer 9. In this embodiment, for example, the means 13 for forming and carrying food products is a commonly-used industrial robot. Although the industrial robot is well-known, it is briefly explained below.

The industrial robot having a bending and forming means 27 comprises a pedestal 17, which is rotatable in a horizontal plane and is disposed on a base 15. Further, a first arm 19, which is swingable (rotatable) around a horizontal axis, is swingably disposed on the pedestal 17. At the distal end of the first arm 19, the proximal end of the second arm 21, which is swingable around an axis that is horizontal and parallel to the axis of the swinging movement of the first arm 19, is disposed.

Then, at the distal end of the second arm 21, the third arm 23, which is perpendicular to the longitudinal direction of the second arm 21 and swingable around an axis that is horizontal and parallel to the axis of the swinging movement of the first arm 19, is disposed. At the distal end of the third arm 23, a rotating arm 25, which is rotatable around an axis (the axis has vertical direction in FIG. 2 and is defined as "a rotational axis") that is perpendicular to the axis of the swinging movement of the third arm 23, is disposed.

Figure 2:
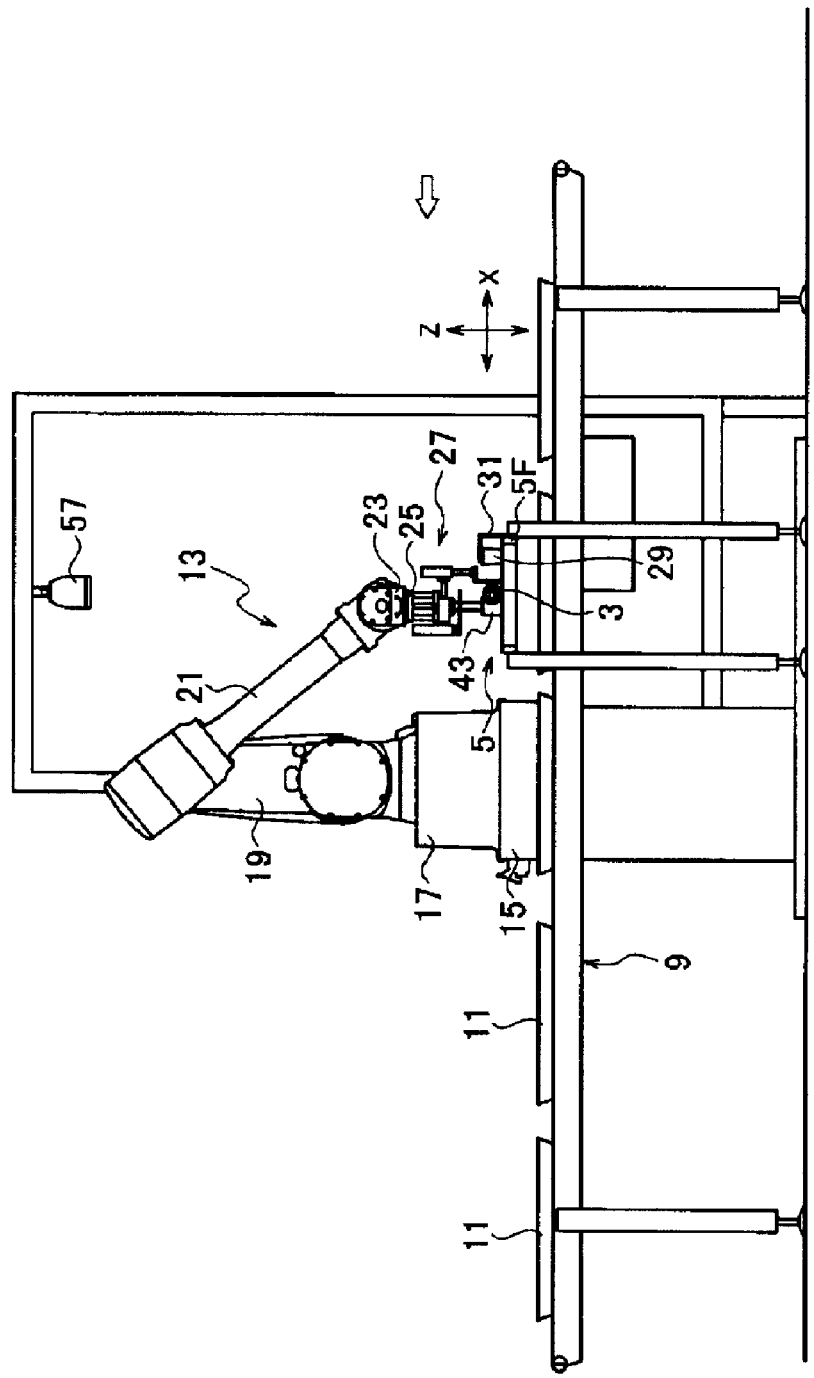
FIG. 2 is a front view showing a whole configuration of the apparatus of the first embodiment for forming a food product into a circular shape of the present inventions.

Thus, the rotating arm 25 can be freely moved and positioned in a X-axis direction (a longitudinal direction of the carrying-out conveyer 9 and a horizontal direction in FIGS. 1 and 2), a Y-axis direction (a longitudinal direction of the conveyer 5 and a vertical direction in FIG. 1), and a Z-axis direction (a vertical direction in FIG. 2). Further, the rotating arm 25 can be controlled to keep the vertical or the horizontal direction in FIG. 2.

At the rotating arm 25, the bending and forming means 27, which forms the food products 3 on the conveyer 5 into a circular shape, is disposed. The bending and forming means 27 forms the food products 3 into a circular shape by bending them in cooperation with a pressing roller 29 disposed close to and above the belt of the conveyer 5. In this embodiment, the pressing roller 29 is rotatably and vertically attached to an inverted L-shaped bracket that is fixed to a frame 5F of the conveyer 5. Namely, the pressing roller 29 is rotatable and an axis of it is vertically disposed at the predefined position above the belt of the conveyer 5. Further, the pressing roller 29 has a tapered shape, wherein its lower diameter is smaller than its upper diameter.

Figure 3:
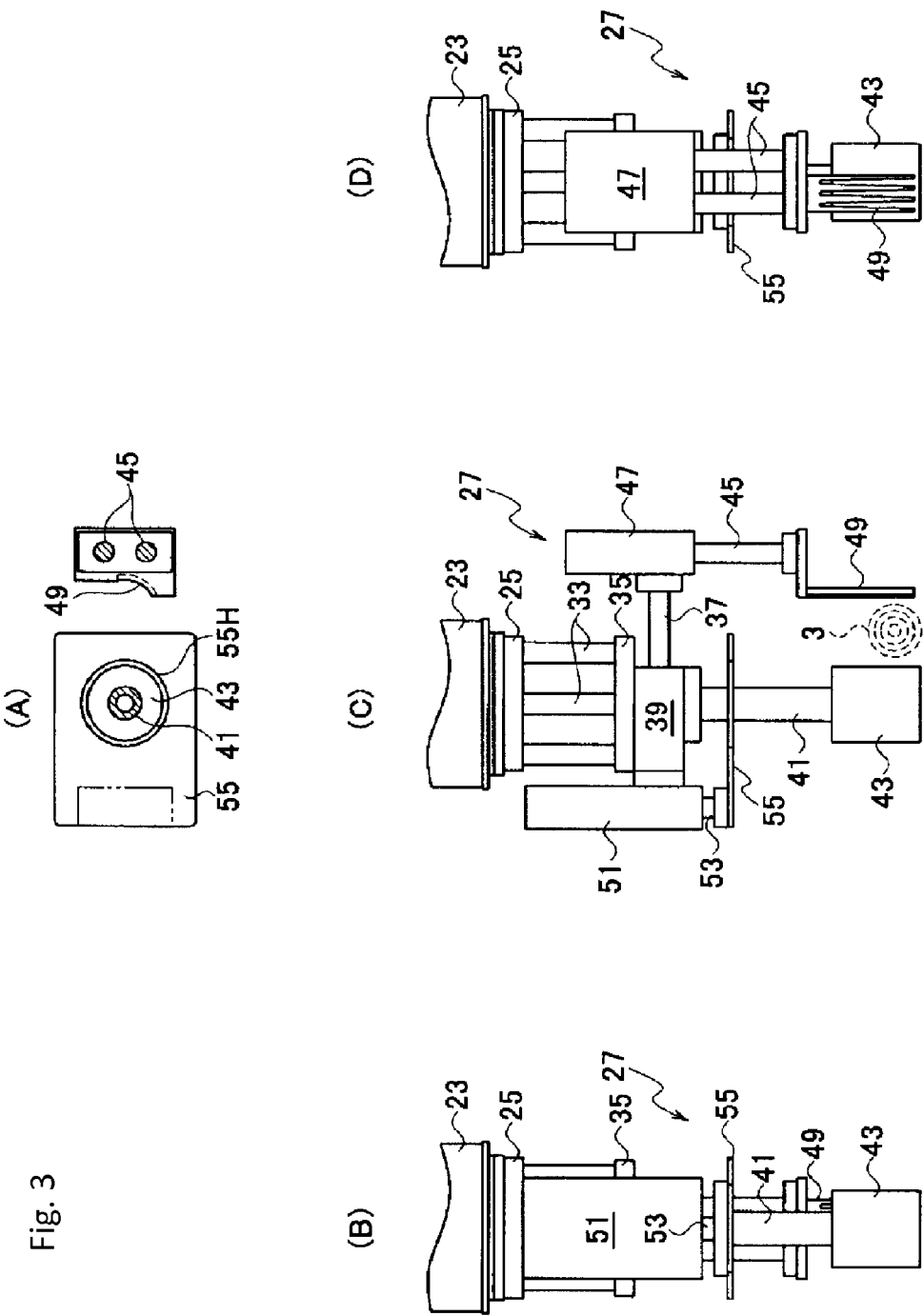
FIG. 3 is a set of explanatory drawings of a configuration of a bending and forming means of the apparatus of the first embodiment for forming a food product into a circular shape of the present inventions.

The bending and forming means 27 has a configuration shown in FIG. 3. Namely, the rotating arm 25 has shafts 33 parallel to the rotational axis of the rotating arm 25. A first reciprocating device 39, such as a fluid pressure cylinder, is attached to a baseplate 35 disposed at the distal ends of the shafts 33. The first reciprocating device 39 has the first reciprocating member 37, such as a piston rod, which can freely reciprocate in the direction perpendicular to the rotational axis.

As shown in FIG. 3(C), a supporting shaft 41, which has a pipe-like structure having an axis corresponding to the rotational axis of the rotating arm 25, is disposed at the bottom surface of the first reciprocating device 39. A core member 43, which forms the food product 3 into a circular shape by winding the food product 3 around the core member 43, is attached to the distal end of the supporting shaft 41.

The core member 43 can radially and outwardly eject compressed air supplied through the supporting shaft 41 having the pipe-like structure. Namely, the core member 43 is made of sintered alloys having a porous structure, or has a structure having a plurality of slits that have an appropriate length and that are disposed at the outer periphery of the core member 43 at an appropriate interval.

Thus, when the food product 3 is wound around the core member 43, if the compressed air is supplied with to the core member 43 through the supporting shaft 41, the core member 43 can radially and outwardly eject the compressed air from its outer periphery. Thus, a layer of air (a film of air) can be formed between the outer surface of the core member 43 and the surface of the inner side of the food product 3 wound around the core member 43.

In other words, since the core member 43 has a means for ejecting the compressed air to form the layer of air, it can be prevented that the food product 3 attaches to (adheres to) the core member 43.

The shape of the cross-sectional surface of the core member 43 is not limited to a round shape. The core member 43 can be such as a regular polygon or a round shape that has one or more flat surface (so-called a D-shaped cross section) at the outer periphery of the core member 43.

By using the regular polygon or the round shape that has one or more flat surface at the outer periphery of the core member 43, the core member 43 can easily wind the food product 3, because the core member 43 has a scratchy surface. Thus, the core member 43 can effectively wind the food product 3.

A first lifting and lowering device 47, such as a fluid pressure cylinder, is attached to the distal end of the first reciprocating member 37. The first lifting and lowering device 47 has a first lifting and lowering member 45, such as a piston rod or a guide rod, which can freely reciprocate in the direction parallel to the supporting shaft 41 (in vertical direction in FIG. 3(C)). Further, a holding member 49, which presses the food product 3 toward the core member 43 and fixes it, is attached to the lower end (the distal end) of the first lifting and lowering member 45. The holding member 49 and the core member 43 are one example of a means for pinching a part of the food product 3 between the holding member 49 and the core member 43 to fix the food product 3. The holding member 49 has a pectinate (see FIG. 3(D)) and arc-like (see FIG. 3(A)) shape that is curved so as to conform to the outer periphery of the core member 43.

Furthermore, the first reciprocating device 39 has a second lifting and lowering device 51 similar to the first lifting and lowering device 47. A dropping member 55, which can freely ascend and descend relative to the core member 43, is attached to a lower end of a second lifting and lowering member 53, which is disposed at the second lifting and lowering device 51 and can freely ascend and descend. The dropping member 55 drops the food product 3 from the core member 43 by descending relative to the core member 43. The dropping member 55 has, for example, a vertical opening 55H, which allows the core member 43 to pass through. However, since it is only necessary for the dropping member 55 to have a function to drop the food product 3 from the core member, the dropping member 55 may have an appropriate shape and configuration, such as a C-shaped structure.

Further, the apparatus 1 for forming food products into a circular shape has an imaging module 57, such as a CCD camera that takes images of a plurality of food products 3 conveyed by the conveyor 5 (see FIGS. 1 and 2). The imaging module 57 takes an image of a specific area on the conveyor 5 from the above, and can detect the shapes, the dimensions, and the positions in the X-axis and Y-axis directions on the conveyor 5, of the plurality of food products 3 within the specific area.

Further, the apparatus 1 has a control device 59 (see FIG. 1).

The control device 59 comprises a computer, which has a function for calculating the shapes, the dimensions, and the positions in the X-axis and Y-axis directions, of the food products 3 on the conveyor 5 by processing the image data taken by the imaging module 57.

Further, the control device 59 has a function for controlling the movements of the conveyor 5, the carrying-out conveyor 9, and the means 13 for forming and carrying food products, based on the image data taken by the imaging module 57.

As explained in the above paragraphs, the food products 3 having the elongated shape (long shape) are conveyed from the upstream side to the downstream side of the conveyor 5. Then, the shapes and the dimensions of the food products 3 conveyed into the specific area on the conveyor 5 are detected (measured) by taking their images by means of the imaging module 57. Further, for example, the positions of the food products 3 in the X-axis and Y-axis directions relative to the pressing roller 29 are also detected. In FIG. 1, the food products 3 are shown so that the longitudinal direction of the food products 3 corresponds to the direction that the conveyor 5 moves. However, it is not necessary to always correspond.

Figure 4:
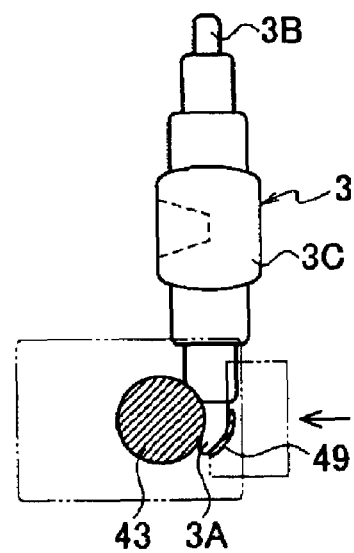
FIG. 4 is a set of explanatory drawings of a process for forming an elongated food product into a circular shape by using the apparatus of the first embodiment of the present inventions.
Figure 4:
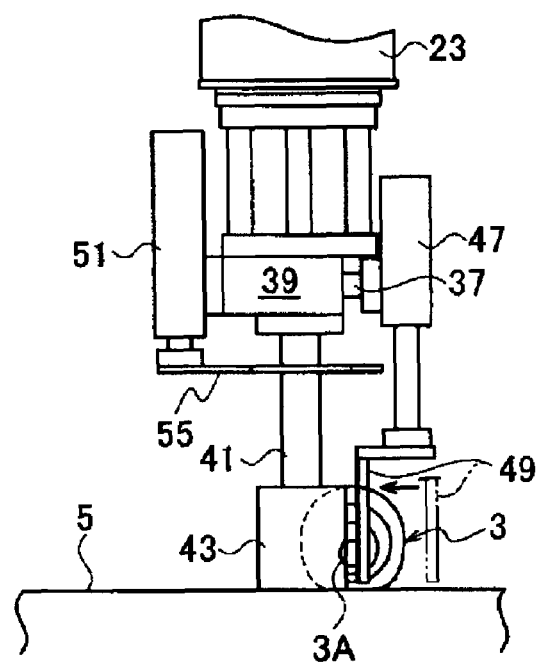
Figure 5:
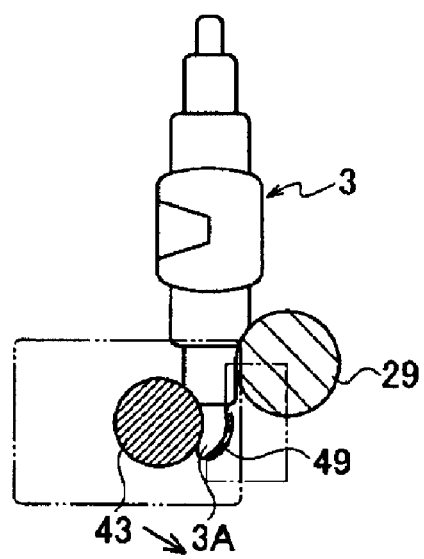
FIG. 5 is a set of explanatory drawings of a process for forming an elongated food product into a circular shape by using the apparatus of the first embodiment of the present inventions.
Figure 5:
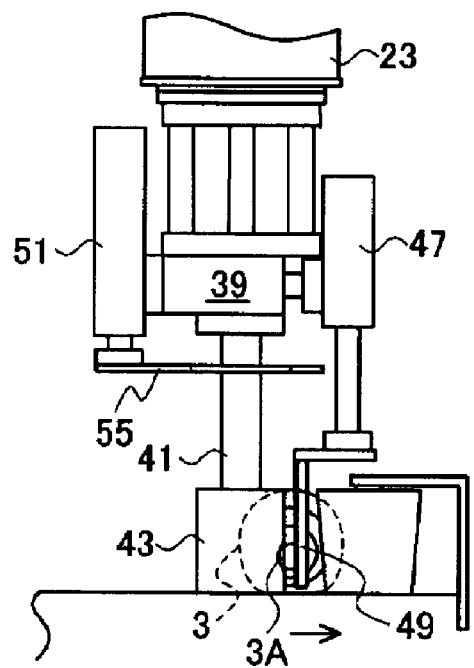
Figure 6:
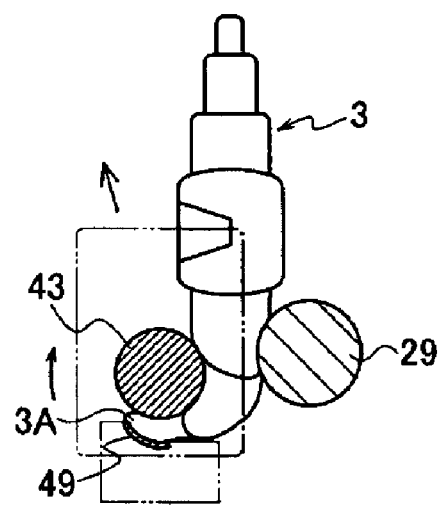
FIG. 6 is a set of explanatory drawings of a process for forming an elongated food product into a circular shape by using the apparatus of the first embodiment of the present inventions.
Figure 6:
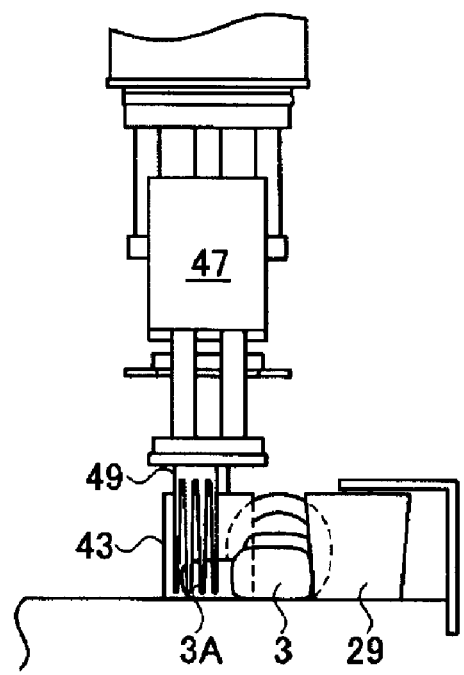
Figure 7:
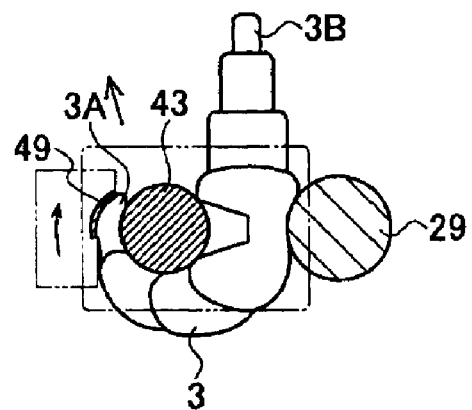
FIG. 7 is a set of explanatory drawings of a process for forming an elongated food product into a circular shape by using the apparatus of the first embodiment of the present inventions.
Figure 7:
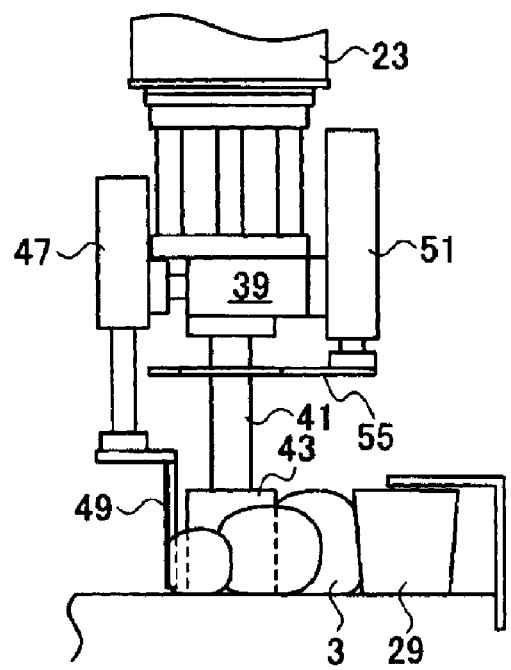
Figure 8:
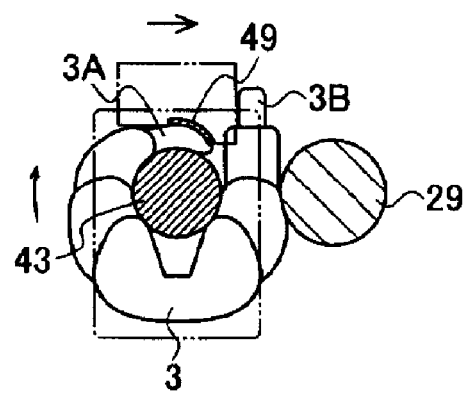
FIG. 8 is a set of explanatory drawings of a process for forming an elongated food product into a circular shape by using the apparatus of the first embodiment of the present inventions.
Figure 8:
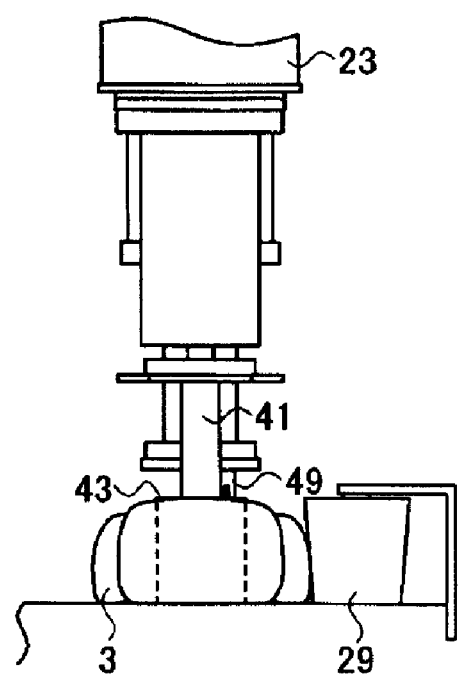
Figure 9:
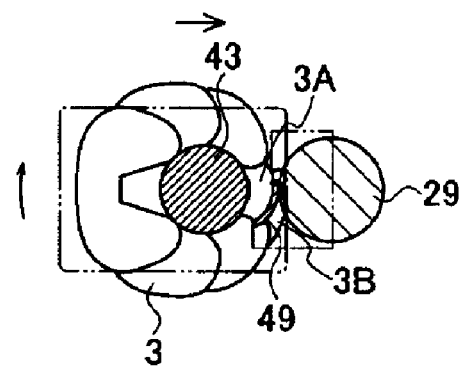
FIG. 9 is a set of explanatory drawings of a process for forming an elongated food product into a circular shape by using the apparatus of the first embodiment of the present inventions.
Figure 9:
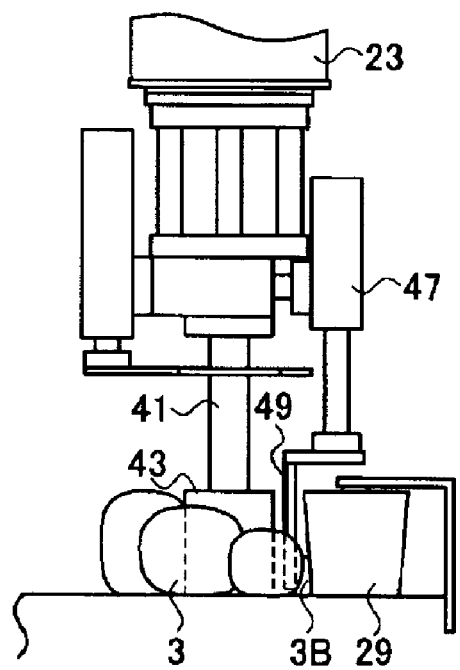

When the first food product 3 reaches to a predetermined position close to the pressing roller 29, one end 3A (a front side) of the first food product 3 is fixed to the outer surface of the core member 43 (see FIG. 4). Alternatively, a means for detecting that the first food product 3 reaches to a predetermined position may be a device for detecting the positions of the food products 3 in the X-axis and Y-axis directions by the imaging module 57, or may be a device for detecting them by an imaging module other than the imaging module 57 or by an optical sensor disposed at an upstream side of the pressing roller 29.

A method for positioning the core member 43 relative to one end 3A of the food product 3 being conveyed is as follows: First, the position in the X-axis and Y-axis directions of one end 3A of the food product 3, which is being conveyed, is detected by the imaging module 57. Then, the core member 43 is positioned in the X-axis, Y-axis, and Z-axis directions by the control device 59, based on the detected position of one end 3A of the food product 3.

Alternatively, the method for positioning the core member 43 relative to one end 3A of the food product 3 being conveyed can be as follows: An imaging module may be used to detect one end 3A of the food product 3, such as a CCD camera disposed at an appropriate position of the bending and forming means 27, such as at the third arm 23.

When the core member 43 is positioned relative to one end 3A of the first food product 3, the core member 43 is to be positioned so that one end 3A of the first food product 3 is to be located between the holding member 49 and the core member 43, which are separated each other. Then, the holding member 49 is lowered from the position where it was lifted in advance above the conveyor 5 by driving the first lifting and lowering device 47. Next, the holding member 49 presses and fixes one end 3A of the food product 3 to the core member 43, by retracting the first reciprocating member 37 by driving the first reciprocating device 39 (see FIG. 4).

Alternatively, when the core member 43 is positioned relative to one end 3A of the first food product 3, one end 3A of the food product 3 can be fixed to the outer periphery of the core member 43, by using a suctioning mechanism that causes suctioning force around the outer periphery of the core member 43 by generating a negative air pressure in the supporting shaft 41.

Then, the core member 43 moves relative to the pressing roller 29 in the X-axis, Y-axis, and Z-axis directions, and presses the food product 3 toward the pressing roller 29. Simultaneously, the food product 3 can be wound around the core member 43 from one end 3A of it by rotating the core member 43 so as to wind the food product 3 (see FIGS. 5-10).

As explained the above, when the food product 3 is wound around the core member 43 from one end 3A of it, an operating pattern for moving the core member 43 in the X-axis, Y-axis, and Z-axis directions relative to the pressing roller 29 can be taught in advance to the means 13 for forming and carrying food products.

Further, the movement of the core member 43 in the X-axis, Y-axis, and Z-axis directions relative to the pressing roller 29 can be controlled based on the image data taken by the imaging module 57.

Namely, when the food products 3 that have an approximately constant shapes and dimensions are formed into a circular shape, it is preferable that the control device 59 is taught in advance an operating pattern for moving the core member 43 in the X-axis, Y-axis, and Z-axis directions, while the core member 43 is rotating, after fixing one end 3A of the food product 3 to the core member 43 at the predetermined position on the conveyer 5. A rotational angle of the core member 43 after fixing one end 3A of the food product 3 to the core member 43 can be detected by a rotary encoder disposed at a servo motor (not shown) to rotate the rotating arm 25. Further, the position of the core member 43 in the X-axis, Y-axis, and Z-axis directions relative to the pressing roller 29 can be calculated based on measurements detected by rotary encoders disposed at every servo motor to individually drive motion axes of the means 13 for forming and carrying food products.

Thus, in response to the shapes and dimensions of the food products 3, the rotational angle (rotational position) of the core member 43 and the position of the core member 43 in the X-axis, Y-axis, and Z-axis directions relative to the pressing roller 29 can be controlled by correlating with each other.

Further, variations of the operating patterns that correlate the rotational angle of the core member 43 and the position of the core member 43 in the X-axis, Y-axis, and Z-axis directions relative to the pressing roller 29, in response to the shapes and dimensions of the food products 3, can be stored in a memory (not shown) of the control device 59. By selecting an appropriate pattern from among those variations, when the shapes and dimensions are changed, the process for winding the food product 3 around the core member 43 from one end 3A of the food product 3 can be easily performed.

By controlling the rotational angle of the core member 43 and the position of the core member 43 in the X-axis, Y-axis, and Z-axis directions relative to the pressing roller 29 by correlating with each other, based on the image data of the food product 3 taken by the imaging module 57, the food product 3 can be also wound around the core member 43 from one end 3A of the food product 3.

Namely, in this case, the shape and dimensions of the food product 3 can be detected (calculated) by taking an image of the food product by means of the imaging module 57.

Namely, the length from one end 3A to the other end 3B of the food product 3, and the position of the central part 3C of the food product 3 between one end 3A and the other end 3B can be calculated (detected). Further, the diameter of the central part 3C can be detected.

Thus, the dimensions of the contour of the food product 3 that is projected on a plane on the conveyer 5 can be detected (calculated). In other words, while detecting the food product 3 along a line from one end 3A to the other end 3B of the food product 3, relationship between a distance in the longitudinal direction from one end 3A of it to a certain position and a diameter of the contour of it (a width of the contour of it that is projected on the plane) at the certain position can be detected.

That is, when a longitudinal direction and a cross direction of the food product 3 are defined as a Y-axis direction and a X-axis direction, respectively, and when one end 3A of the food product 3 is defined as a basic position in the Y-axis direction, the relationship between the distance of the certain position in the Y-axis direction and the width in X-axis direction of the food product 3 at the certain position can be detected (calculated).

Thus, when the food product 3 is wound around the core member 43 from one end 3A of it, the rotational angle of the core member 43 and the position of the core member 43 in the X-axis, Y-axis, and Z-axis directions relative to the pressing roller 29 are controlled by the control device 59. Then, since the position of the core member 43 relative to the pressing roller 29 and a route of the core member 43 for accessing the pressing roller 29 are controlled as shown by arrows in FIGS. 5~10, the food product 3 is pressed toward the pressing roller 29 with an appropriate pressure by the core member 43. In the other words, while the pressing roller 29 presses the food product 3 relatively toward the core member 43 with an appropriate pressure, the pressing roller 29 can wind the food product 3 around the core member 43 from one end 3A of it.

As another method for winding the food product 3 around the core member 43 from one end 3A of it with an appropriate pressure, the following methods can be used:

For example, by disposing a pressure sensor at the pressing roller 29, and by controlling the core member 43 so as to maintain a detection value of the pressure sensor within an appropriate range, the food product 3 is wound around the core member 43 by rotating the core member 43 and by pressing the food product 3 relatively toward the pressing roller 29.

Further, for example, by disposing a detecting means, such as a CCD camera, for detecting a condition of contact between the pressing roller 29 and the food product 3, while detecting the condition of the contact, the food product 3 is wound around the core member 43 from one end 3A of it by rotating the core member 43.

As explained in the above paragraphs, when the food product 3 is wound around the core member 43 from one end 3A of it by rotating the core member 43 and by pressing the food product 3 relatively toward the pressing roller 29, the other end 3B of the food product 3 is radially overlapped with one end 3A of it. That is, one end 3A of the food product 3 is located at the inner side of the holding member 49, and the other end 3B of the food product 3 is located at the outer side of the holding member 49. Consequently, one end 3A and the other end 3B are radially overlapped each other (see FIG. 9).

Figure 10:
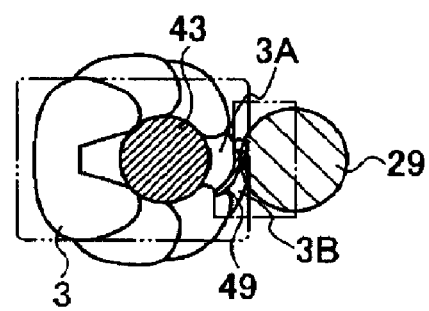
FIG. 10 is a set of explanatory drawings of a process for forming an elongated food product into a circular shape by using the apparatus of the first embodiment of the present inventions.
Figure 10:
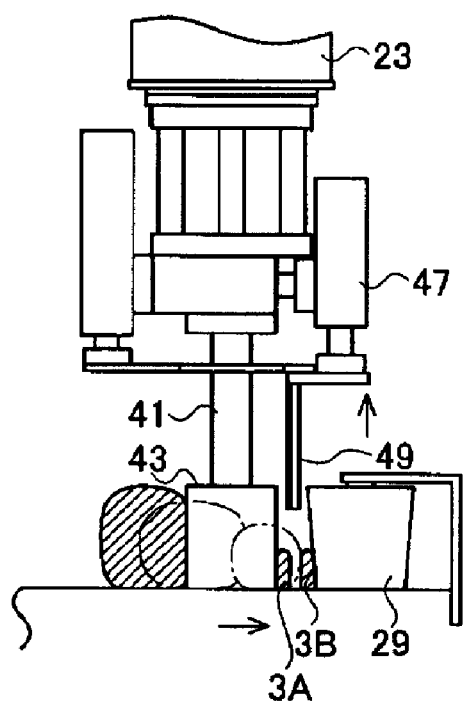

Then, the holding member 49 is lifted from the position between one end 3A and the other end 3B, of the food product 3, by driving the first lifting and lowering device 47 (see FIG. 10). After lifting the holding member 49, the overlapped part of one end 3A and the other end 3B, of the food product 3, is pressed toward the pressing roller 29 with a predetermined pressure by moving the core member 43, and consequently, the overlapped part of the food product 3 is pressed relatively toward the core member 43 by the pressing roller 29. Consequently, the overlapped part of one end 3A and the other end 3B, of the food product 3, are adhered each other by pinching the overlapped part between the core member 43 and the pressing roller 29.

Then, the core member 43 presses the outer side surface of the food product 3 formed into a circular shape toward the pressing roller 29 with an appropriate pressure, by rotating the core member 43 and by controlling a distance between the relative positions of the pressing roller 29 and the core member 43, in response to a diameter of the food product 3 changing from one end 3A to the other end 3B. Consequently, the pressing roller 29 presses the food product 3 relatively toward the core member 43 with an appropriate pressure.

Figure 11:
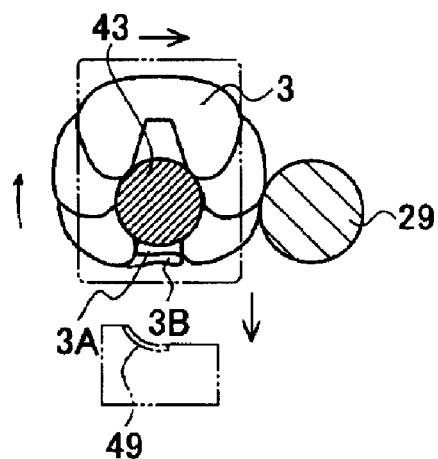
FIG. 11 is a set of explanatory drawings of a process for forming an elongated food product into a circular shape by using the apparatus of the first embodiment of the present inventions.
Figure 11:
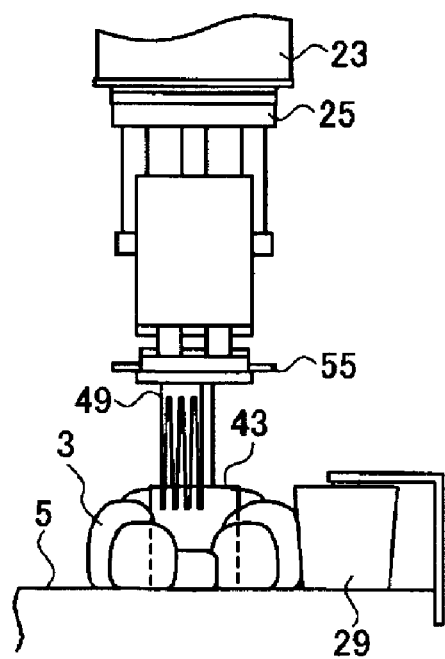

Thus, since the inner side surface of the food product 3, which is formed into a circular shape by being would around the core member 43, is cohered to the outer surface of the core member 43, the shapes of the inner side surface and the outer side surface of the food product 3 are fixed up. Consequently, the whole shape of the food product 3 is also fixed up (see FIG. 11).

Figure 12:
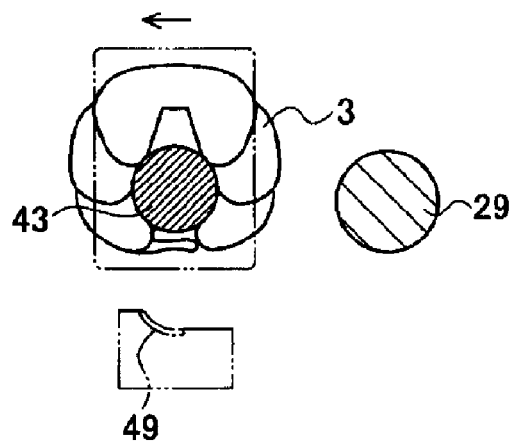
FIG. 12 is a set of explanatory drawings of a process for forming an elongated food product into a circular shape by using the apparatus of the first embodiment of the present inventions.
Figure 12:
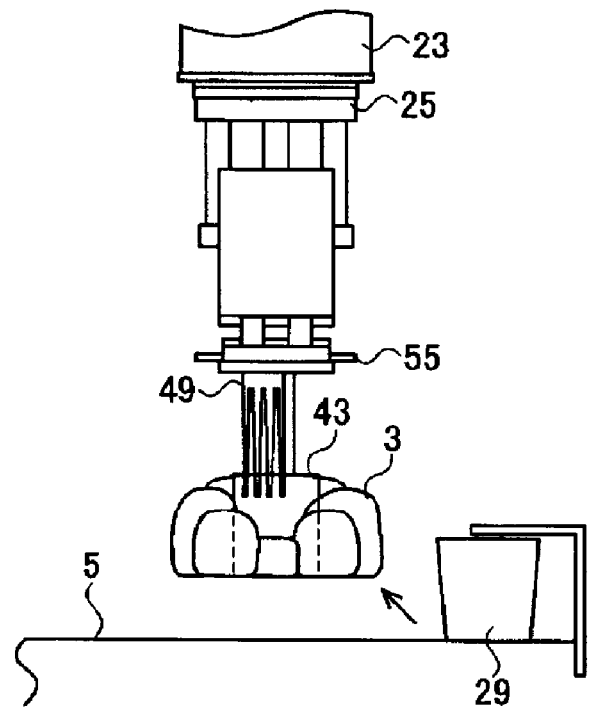

As explained in the above paragraphs, while the inner side surface of the food product 3 formed into a circular shape is cohered to the outer surface of the core member 43, the food product 3 can be lifted from the conveyer 5, by lifting the bending and forming means 27 by driving the first arm 19, the second arm 21, the third arm 23, and the rotating arm 25 (see FIG. 12).

FIG. 12 exemplifies the state that the holding member 49 is located apart from the food product 3. However, a part of the food product 3 formed into a circular shape can be pinched between the core member 43 and the holding member 49 by pressing the part of the food product 3 toward the core member 43 by the holding member 49.

Figure 13:
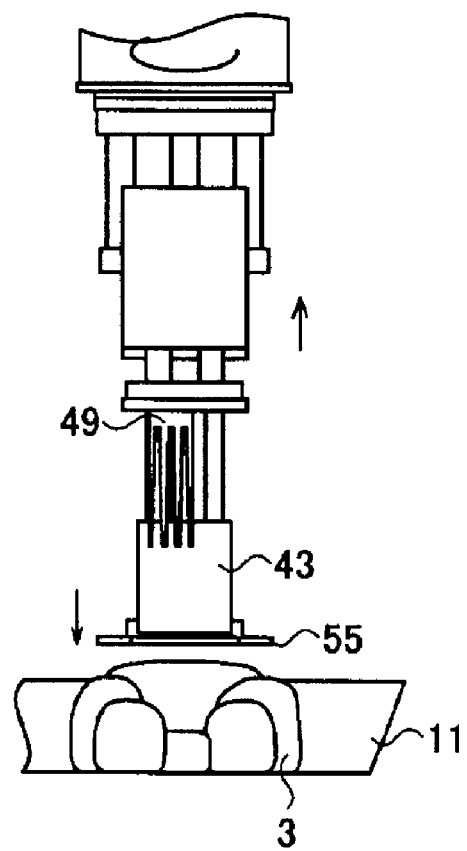
FIG. 13 is an explanatory drawing of a process for forming an elongated food product into a circular shape by using the apparatus of the first embodiment of the present inventions.

As explained in the above paragraph, after lifting the food product 3 formed into a circular shape from the conveyer 5, the food product 3 is moved to and positioned at a desired position on a tray 11 disposed on the carrying-out conveyer 9. Then, while lifting the bending and forming means 27, by driving the second lifting and lowering device 51 to lower the dropping member 55 relative to the core member 43, and to let the dropping member 55 press the upper surface of the food product 3, the core member 43 can be drawn out from the food product 3 formed into a circular shape (see FIG. 13).

As explained in the above paragraph, when the core member 43 is drawn out from the food product 3, the supporting shaft 41 having a pipe-like structure supplies the core member 43 with compressed air, and the compressed air is radially and outwardly ejected from the outer surface of the core member 43. Consequently, since a layer of the air is formed between the outer surface of the core member 43 and the inner side surface of the food product 3 formed into a circular shape, the core member 43 can be smoothly drawn out from the food product 3.

In the above paragraphs, it is exemplified that one end 3A and the other end 3B of the food product 3 are overlapped and adhered each other. The present inventions are not limited to such a configuration. It is possible to form the food product 3 into the state that one end 3A and the other end 3B are opened and face each other so as to form a C-shape.

As explained in the above paragraphs, when the food product 3 having an elongated shape is formed into a circular shape or a C-shape, one end 3A of the food product 3 is fixed to the core member 43, and the core member 43 is rotated. At the same time, the food product 3 is wound around the core member 43 by rotating the core member 43, the food product 3 is pressed toward the core member 43 by moving the core member 43 close to the pressing roller 29.

Namely, the elongated food product 3 is formed into a round shape by being continuously wound from one end 3A to the other end 3B.

Thus, the process for forming a food product 3 into a circular shape can be efficiently performed, and a productivity of the food product formed into a circular shape can be improved.

Incidentally, various sorts of modifications for the first embodiment of the inventions are possible. For example, in the description in the above paragraphs, the conveyer 5 is continuously operating while the food product 3 is formed into a circular shape. However, it is possible to stop the conveyer 5 while the food product 3 is formed into a round shape.

Next, a second embodiment of the present inventions is explained based on the drawings.

An apparatus 101 for forming a food product into a circular shape of the second embodiment of the present inventions forms a food product 3 into a circular shape by passive movements of a core member 143, and by active movements of a pressing roller 129, as described below.

Before a whole configuration of the apparatus 101 of the second embodiment of the inventions is explained, a part to form a food product 3 into a circular shape is explained. Then, the whole configuration of the apparatus 101 is explained.

Figure 16:
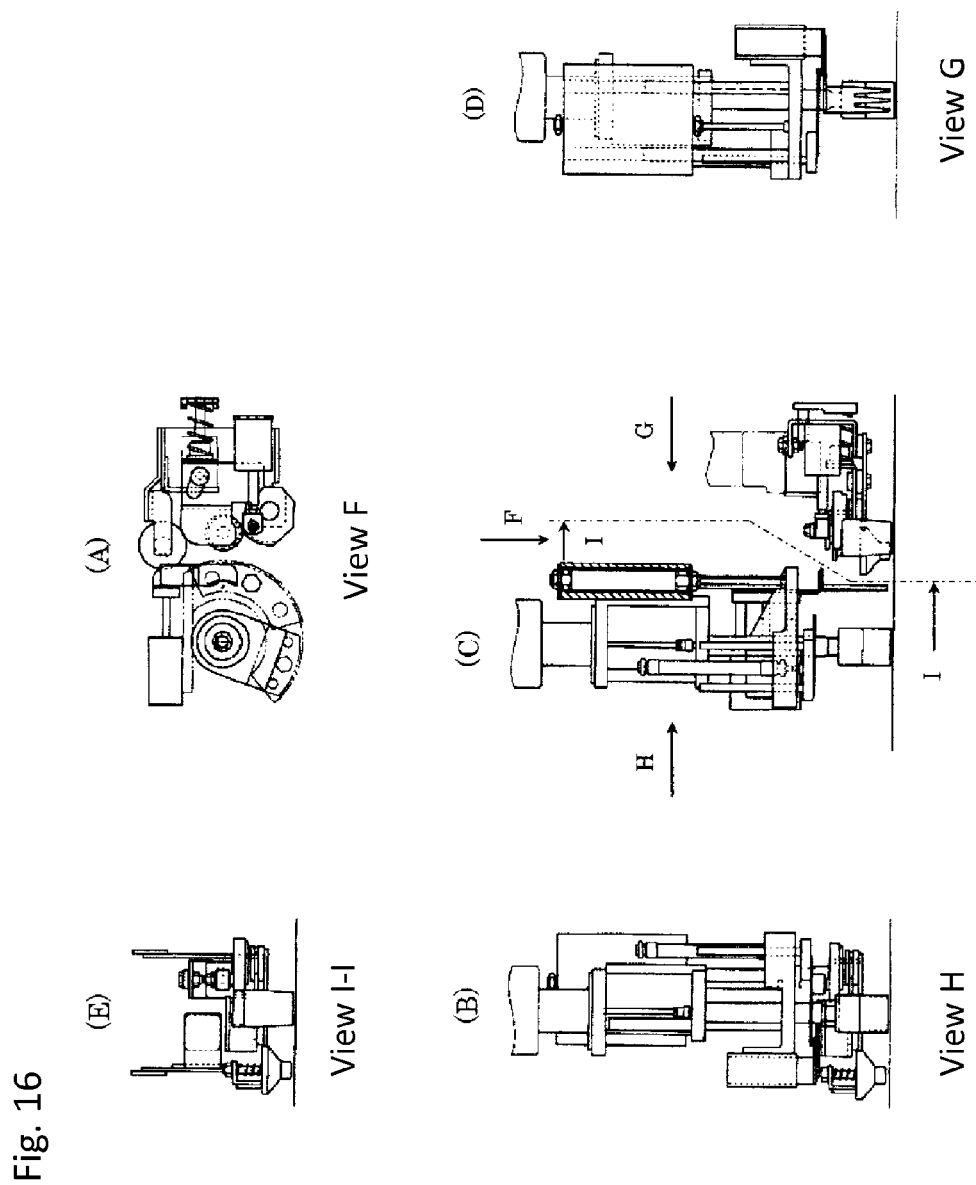
FIG. 16 is a set of explanatory drawings of a configuration of a forming unit (a bending and forming means and a pressing roller unit) of the apparatus of the second embodiment for forming a food product into a circular shape of the present inventions.
Figures 1, 16:
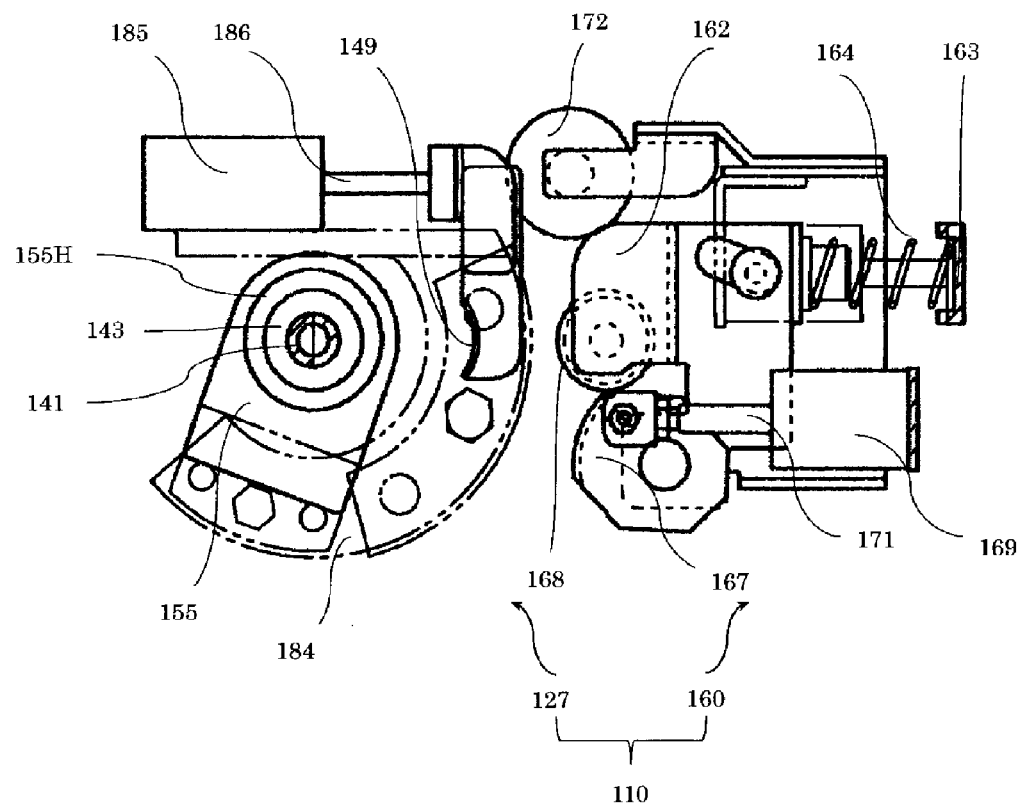
Figures 2, 16:
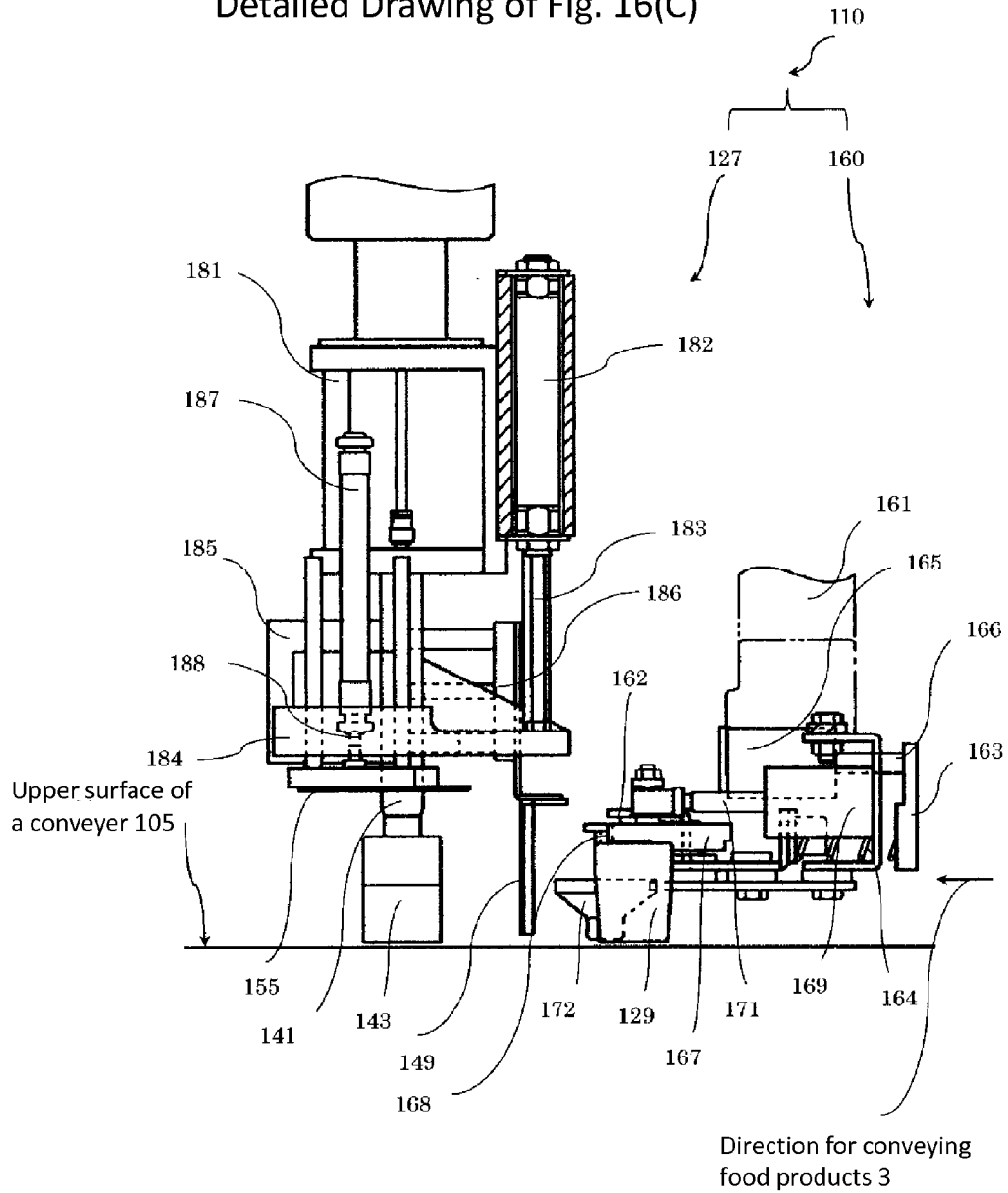
Figures 3, 16:
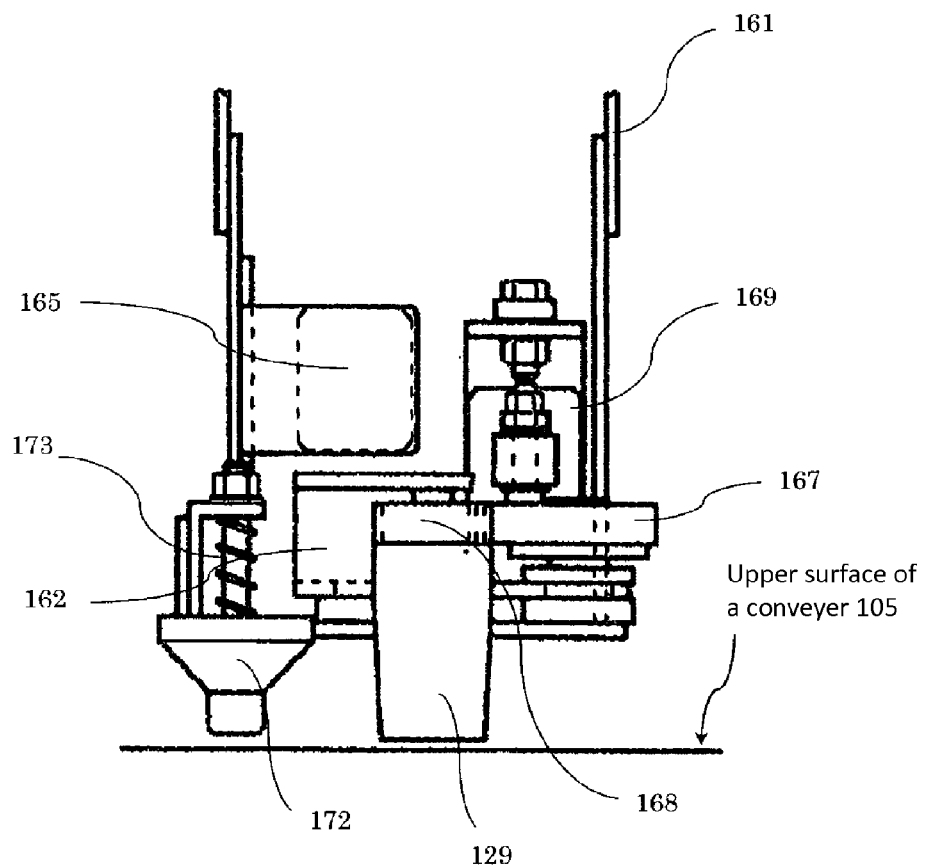

As shown in FIG. 16, in the apparatus 101 of the second embodiment of the inventions, the food product 3 is formed into a circular shape by a bending and forming means 127 in cooperation with a pressing roller unit 160. Hereafter the bending and forming means 127 and the pressing roller unit 160 are collectively called as a forming unit 110.

First, the configuration of the pressing roller unit 160 having a pressing roller 129 is explained based on FIGS. 16, 16-1, 16-2, and 16-3.

The pressing roller 129 is rotatably attached to a bracket 162 for supporting the pressing roller. The bracket 162 for supporting the pressing roller is swingably attached to a bracket 161 for supporting the pressing roller unit by means of a spring 164, a stopper plate 163 for the spring 164, a second reciprocating member 166, and a second reciprocating device 165 disposed between the bracket 162 and the bracket 161. Thus, the pressing roller 129 can move in the horizontal direction in FIG. 16-2 so that it moves close to or apart from the core member 143.

In the above, for example, the second reciprocating device 165 is a fluid pressure cylinder, and the second reciprocating member 166 is a piston rod. Thus, since the pressing roller 129 is biased leftward in FIG. 16-2 by the spring 164, when the pressing roller 129 presses the food product 3 toward the core member 143, the spring force of the spring 164 can be controlled by extending and retracting the second reciprocating member 166 in the horizontal direction in FIG. 16-2 by the second reciprocating device 165.

Further, a gear 168 is fixed above the pressing roller 129, and a gear 167 engaging with the gear 168 is attached to the bracket 161 for supporting the pressing roller unit. Further, a third reciprocating device 169 is attached to the bracket 161 for supporting the pressing roller unit, and a third reciprocating member 171 extends from the third reciprocating device 169.

Since the distal end of the third reciprocating member 171 is connected with the gear 167, the gear 167 and the gear 168 engaging with the gear 167 are turned in the clockwise and counterclockwise directions by extending or retracting the third reciprocating member 171 in the horizontal direction in FIG. 16-2 by the third reciprocating device 169. Consequently, the pressing roller 129 is forced to turn in the clockwise and counterclockwise directions.

Namely, when the food product 3 is formed into a circular shape by being pressed toward the core member 143 by the pressing roller 129, the pressing roller 129 is forced to rotate. For example, the third reciprocating device 169 is a fluid pressure cylinder, and the third reciprocating member 171 is a piston rod.

Incidentally, in the state shown in FIG. 16-1, namely, in the state that the third reciprocating member 171 of the third reciprocating device 169 extends at a maximum, the gear 167 does not engage with the gear 168. Thus, the pressing roller 129 is supported by the bracket 161 so as to be able to freely rotate.

The pressing roller 129 has a tapered shape so that the diameter of its bottom is smaller than that of its top. However, the pressing roller may have a straight cylindrical shape. Further, the cross-sectional shape of the pressing roller 129 is not limited to a round shape. A regular polygon, or a shape that has one or more flat surfaces (so-called a D-shaped cross section) on the outer surface of the cylinder may be applied to the cross-sectional shape of the pressing roller 129.

By using the regular polygon shape, or the shape that has one or more flat surfaces on the outer surface of the cylinder as the cross-sectional shape of the pressing roller 129, when it moves along the surface of the outer side of the food product 3, it can rotate on the surface of the outer side of the food product 3 without slipping. Thus, the food product 3 can be efficiently formed into a circular shape.

In the above paragraphs, it is explained that a set of gears (a gear 167 and a gear 168) is used for a mechanism forcing the pressing roller 129 to rotate. However, it is not limited to that mechanism. For example, a friction wheel system comprising a rigid wheel and a wheel made of an elastic material, such as a rubber, can be applied to the mechanism forcing the pressing roller 129 to rotate.

Further, a holding roller 172 is attached to the bracket 161 for supporting the pressing roller unit. The holding roller 172 is used for preventing the other end 3B of the food product 3 from being lifted, while one end 3A of the food product 3 is being pressed when the food product 3 is formed into a circular shape.

To add a downward force to the holding roller 172, it is connected with the bracket 161 for supporting the pressing roller unit by means of a spring 173.

In the above paragraphs, the configuration of the pressing roller unit 160 is explained. The upper part of the bracket 161 for supporting the pressing roller unit is supported by a supporting structure unit 190 disposed at the upper part of the apparatus 101. As explained below, the pressing roller unit 160 can reciprocate in the direction that the food products 3 are conveyed and can ascend and descend in the vertical direction.

Next, the configuration of the bending and forming means 127 is explained based on FIGS. 16, 16-1, 16-2, and 16-3.

A supporting structure 181 is used to support the bending and forming means 127. The core member 143, which forms the food product 3 into a circular shape by winding the food product 3 around itself, is attached to a distal end of a supporting shaft 141, which is attached to the lower surface of the supporting structure 181 and extends downward. The core member 143 is attached to the supporting structure 181 so that the axis of the core member 143 corresponds to the rotating axis of the supporting structure 181.

The core member 143 can radially and outwardly eject compressed air that is supplied through the supporting shaft 141 having a pipe-like structure. To achieve this function, the core member 143 has an internally-located conduit for supplying the compressed air and is made from a material having a porous structure, such as sintered alloys, so that the core member 143 has air permeability. Alternatively, the core member 143 has a structure having a plurality of slits that have an appropriate length and are disposed at the outer periphery of the core member 143 at an appropriate interval.

Thus, at the state that the food product 3 has been wound around the core member 143, if the compressed air is supplied with to the core member 143 through the supporting shaft 141, the core member 143 can radially and outwardly eject the compressed air from its outer periphery. Thus, a layer of air (a film of air) can be formed between the outer surface of the core member 143 and the surface of the inner side of the food product 3 being wound around the core member 143.

In other words, since the core member 143 has a means for ejecting the compressed air to form the layer of air, it can be prevented that the food product 3 attaches to (adheres to) the core member 143.

The shape of the cross-sectional surface of the core member 143 is not limited to a round shape. The core member 143 may have shapes, such as a regular polygon or a round shape that has one or more flat surfaces (so-called a D-shaped cross section) at the outer periphery of the core member 143.

By using the regular polygon or the round shape that has one or more flat surfaces at the outer periphery of the core member 143, the core member 143 can easily wind the food product 3, because the core member 143 has a scratchy surface. Thus, the core member 143 can effectively wind the food product 3.

A third lifting and lowering device 182 is attached to the supporting structure 181 for supporting the bending and forming means 127, as shown in FIG. 16-2. A third lifting and lowering member 183 extends from the lower end of the third lifting and lowering device 182. A bracket A 184 is fixed to the distal end of the third lifting and lowering member 183. The bracket A184 can ascend and descend by driving the third lifting and lowering device 182.

Further, a fourth reciprocating device 185 is attached to the bracket A184, and a fourth reciprocating member 186 extends from the distal end of the fourth reciprocating device 185. A holding member 149 is fixed to the distal end of the fourth reciprocating member 186. The holding member 149, which is an example of a holding means, is used for pressing the food product 3 toward the core member 143 and holding a part (e.g., one end 3A) of the food product 3 by pinching it between the holding member 149 and the core member 143. The holding member 149 has a pectinate (see FIG. 16(D)) and an arc-like (see FIG. 16-1) shape that is curved along the outer periphery of the core member 143. The holding member 149, which is the holding means, can move close to and away from the core member 143 by driving the fourth reciprocating device 185 in the horizontal direction. Further, since the holding member 149 is connected with the bracket A184 by means of the fourth reciprocating device 185 and the fourth reciprocating member 186, the holding member 149 can ascend and descend together with the bracket A184 by driving the third lifting and lowering device 182.

Further, a fourth lifting and lowering device 187 is attached to the bracket A184, and a fourth lifting and lowering member 188 extends from the distal end of the fourth lifting and lowering device 187. A dropping member 155 is fixed to the distal end of the fourth lifting and lowering member 188. The dropping member 155 can separate the food product 3 from the core member 143 by descending relative to the core member 143.

In FIG. 16(A), the dropping member 155 that has a bore 155H, through which the core member 143 can pass, is shown. However, the structure of the dropping member 155 is not limited to that configuration. Any structure that can separate the food product 3 from the core member 143, such as a plate having a C-shaped opening, can be used for the dropping member 155. The dropping member 155 can ascend and descend relative to the core member 143 by driving the fourth lifting and lowering device 187 in the vertical direction.

In the above, for example, the third lifting and lowering device 182, the fourth lifting and lowering device 187, and the fourth reciprocating device 185 are fluid pressure cylinders, and the third lifting and lowering member 183, the fourth lifting and lowering member 188, and the fourth reciprocating member 186 are piston rods.

In the above paragraphs, the configuration of the bending and forming means 127 is explained. The upper surface of the supporting structure 181 for supporting the bending and forming means 127 is connected with the supporting structure unit 190 disposed at the upper portion of the apparatus 101 for forming the food products 3 into a circular shape. As explained below, the bending and forming means 127 can reciprocate in the direction that the food products 3 are conveyed, and can move in the vertical direction.

In the above paragraphs, the configuration of the bending and forming means 127 and the pressing roller unit 160 are explained.

Next, the whole configuration of the apparatus 101 of the second embodiment of the inventions is explained.

Figure 14:
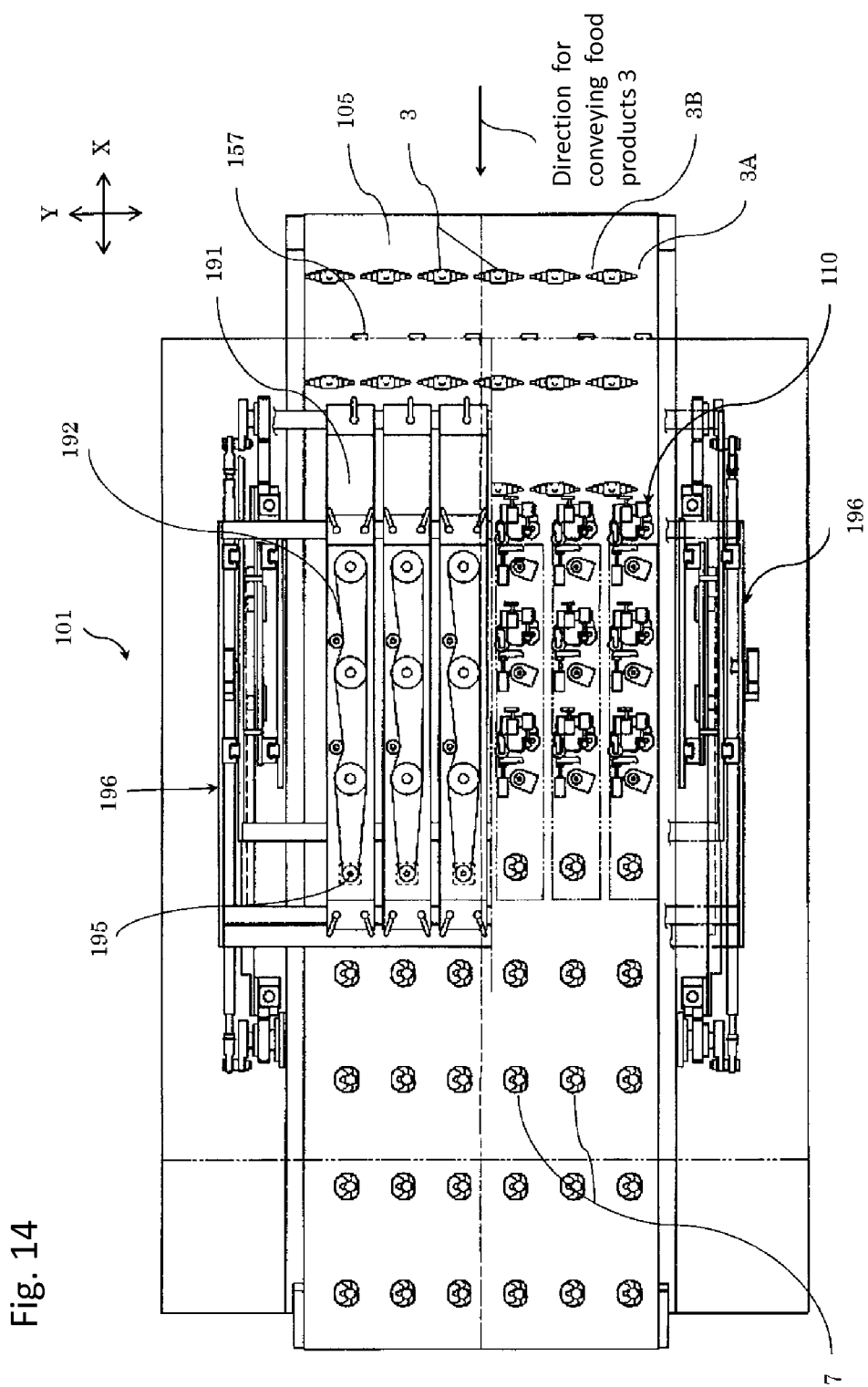
FIG. 14 is a plain view showing a whole configuration of an apparatus of the second embodiment for forming a food product into a circular shape of the present inventions.
Figure 15:
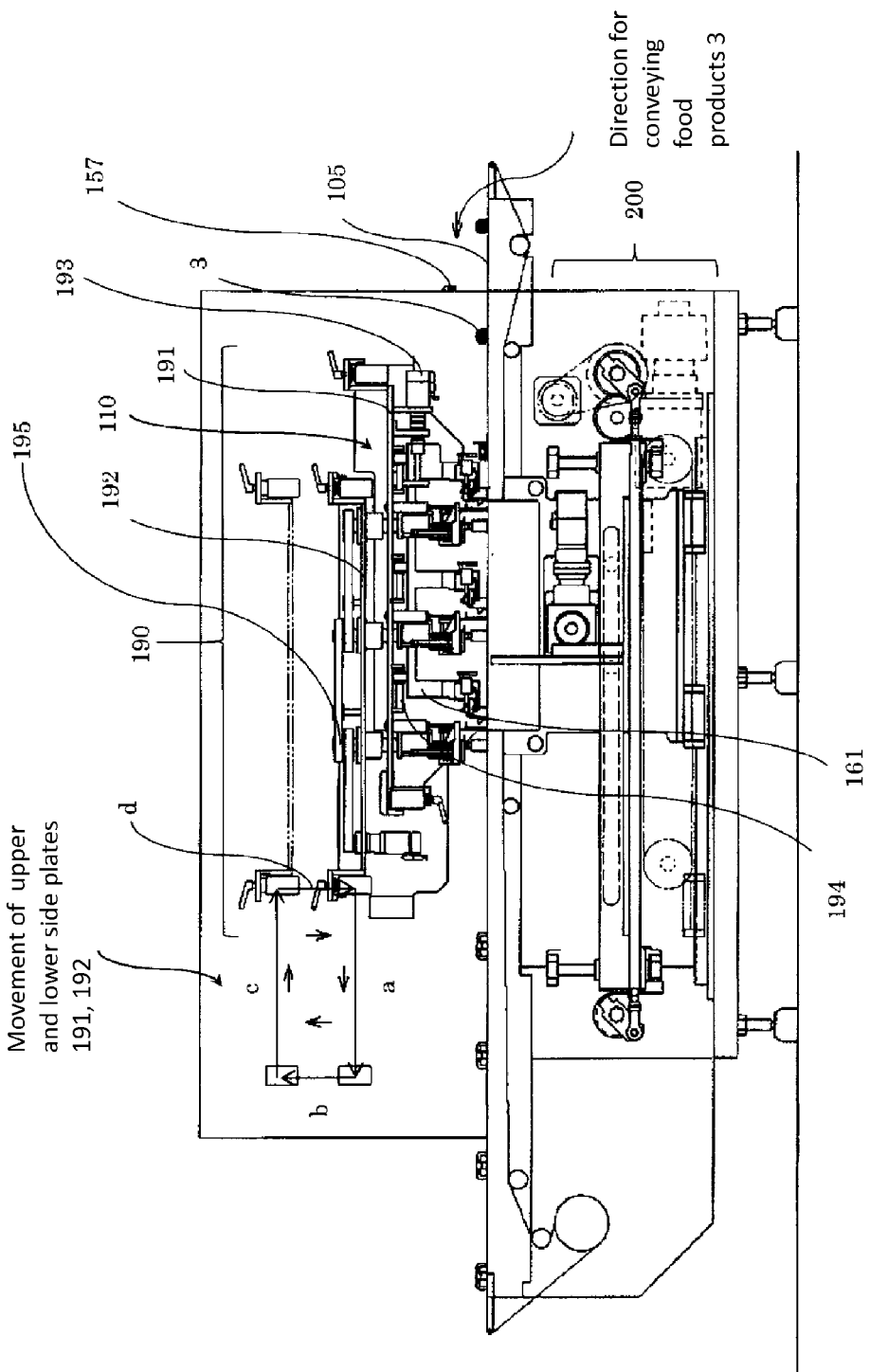
FIG. 15 is a front view showing a whole configuration of the apparatus of the second embodiment for forming a food product into a circular shape of the present inventions.

In the apparatus 101 of the second embodiment, one bending and forming means 127 and one pressing roller unit 160 constitute one forming unit 110 for forming a food product 3 into a circular shape. Further, in the apparatus 101 of the second embodiment, the apparatus 101 comprises one or more forming units 110. In FIGS. 14 and 15, the apparatus 101 that has eighteen (18) sets of the forming units 110 (three (3) sets of the forming units 110 placed in a row, which corresponds to the direction that the food products 3 are conveyed, and six (6) sets of the forming units 110 placed in a column, which corresponds to the perpendicular to the direction that the food products 3 are conveyed) is exemplified.

Hereinafter, based on FIGS. 14 and 15, the whole configuration of the apparatus 101 for forming the food products 3 into a circular shape is explained.

The apparatus 101 comprises:

a conveyer 105, which conveys the food products 3;

a plurality of the forming units 110, which are disposed above the conveyer 105;

a supporting structure unit 190, which is disposed above a plurality of the forming units 110, holding a plurality of the forming units 110, and integrally moving a plurality of the forming units 110 in a vertical and a horizontal direction; and a driving device 200, which is disposed below the conveyer 105, integrally moving the supporting structure unit 190 in a vertical and a horizontal direction.

The conveyer 105 carries the food products 3 that are aligned in a plurality of lines and are placed at a predetermined and constant interval, into an area below the forming units 110. Further, the conveyer 105 carries out the food products 7 that are formed into a circular shape, from the area below the forming units 110.

In the second embodiment of the inventions, a belt conveyer, which is driven by controlling a rotation of a controlled motor (not shown), is used as the conveyer 105.

The supporting structure unit 190 comprises lower side plates 191, the number of which corresponds to the number of columns of the forming units 110 (the number is six (6) in this embodiment), and upper side plates 192, each of which corresponds to each of the lower side plates 191. Each pair of the lower side plate 191 and the upper side plate 192 is connected with the driving device 200 by means of connecting structures 196, which are disposed at both sides of the belt conveyer 105.

Further, three (3) sets of the pressing roller unit 160 are disposed on each lower side plate 191 at a predetermined interval, and three (3) sets of the bending and forming means 127 are disposed on each upper side plate 192 at a predetermined interval. Consequently, three (3) sets of the bending and forming means 127 and three (3) sets of the pressing roller unit 160 are disposed to face each other above the conveyer 105, and constitute three (3) sets of the forming units 110.

A rotational driving device 195, which comprises a motor, timing pulleys, and timing belts, is disposed on the upper side plate 192. The rotational driving device 195 can simultaneously rotate three (3) sets of the bending and forming means 127 in the clockwise and counterclockwise directions. Three (3) sets of the pressing roller unit 160 disposed at the lower side plate 191 are connected to become integrated with a supporting structure 194 for supporting the pressing roller unit 160, and are fixed to the lower side plate 191. The supporting structure 194 can reciprocate in the direction that the food products 3 are conveyed relative to the lower side plate 191 by driving a motor 193.

Thus, the three (3) sets of the pressing roller unit 160 can integrally move close to and away from the three (3) sets of the bending and forming means 127, respectively.

As explained in the above paragraphs, since the lower side plates 191 and the upper side plates 192 are connected with the driving device 200 by means of the connecting structures 196, the lower side plates 191 and the upper side plates 192 can integrally move in the vertical direction, and can integrally reciprocate in the direction that the food products 3 are conveyed.

Thus, the lower side plates 191 and the upper side plates 192 can integrally move along the route shown by arrows in FIG. 15.

Namely, three (3) sets of the forming units 110 can integrally move with keeping a predetermined interval along the following route:

First, three (3) sets of the forming units 110 can move (descend) close to the upper surface of the conveyer 105 (a route "d"). Then, they can move toward the downstream in the direction that the food products 3 are conveyed in synchronization with the motion of the conveyer 105 (a route "a"), move (ascend) apart from the upper surface of the conveyer 105 (a route "b"), and move toward the upstream in the direction that the food products 3 are conveyed (a route "c").

Further, the upper side plates 192 can move in the vertical direction by the driving device 200, independently of the lower side plates 191. Thus, three (3) sets of the bending and forming means 127 disposed at the upper side plates 192 can move in the vertical direction relative to three (3) sets of the pressing roller unit 160.

The driving device 200 can drive the upper side plates 192 and the lower side plates 191 by means of the connecting structures 196. Since such a mechanism for driving the upper side plates 192 and the lower side plates 191 can be assembled by combining commonly-used mechanical elements, the description of it is omitted.

As explained in the above paragraphs, in the apparatus 101 of the second embodiment, for forming food products 3 into a circular shape, the apparatus 101 uses eighteen (18) sets of the forming units 110 (three (3) sets of the forming units 110 placed in a row, which corresponds to the direction that the food products 3 are conveyed, and six (6) sets of the forming units 110 placed in a column, which corresponds to the perpendicular to the direction that the food products 3 are conveyed).

Thus, six (6) pairs of the upper side plates 192, each of which has three (3) sets of the bending and forming means 127, and the lower side plates 191, each of which has three (3) sets of the pressing roller unit 160, are placed side by side in a column, which corresponds to the perpendicular to the direction that the food products 3 are conveyed.

Since the six (6) pairs of the upper side plates 192 and the lower side plates 191 are connected with the driving device 200 by means of the connecting structures 196, the six (6) pairs of the upper side plates 192 and the lower side plates 191 can integrally move as explained in the above paragraphs.

In the apparatus 101 of the second embodiment for forming food products 3 into a circular shape, a detecting module 157, such as a sensor for detecting a plurality of the food products 3 that are conveyed by the conveyer 105, is disposed at an upstream side of and above the conveyer 105. Since the detecting module 157 can monitor a specific area on the conveyer 105, regarding a plurality of food products 3 in the specific area, the positions of ends 3A of them in X-axis and Y-axis directions (in horizontal directions) on the conveyer 105 can be detected.

Further, the apparatus 101 comprises a control device 159 (not shown).

The control device 159 is comprised of a computer. The control device 159 has a function to calculate the positions of a plurality of the food products 3 in the X-axis and Y-axis directions on the conveyer 105, by processing positional information based on signals detected by the detecting module 157. Further, the control device 159 has functions for controlling the conveyer 105, the driving device 200 to drive the supporting structure unit 190, the bending and forming means 127, and the pressing roller unit 160, based on signals detected by the detecting module 157.

In the apparatus 101 explained in the above paragraphs, the food products 3 having an elongated shape (a long shape) are conveyed from the upstream to the downstream of the conveyer 105. When the detecting module 157 detects the food products 3 on the conveyer 105, the detecting module 157 also detects the positions of one ends 3A of the food products 3 that are carried into a predetermined area. Further, for example, the positions of one ends 3A of the food products 3 in the X-axis and Y-axis directions relative to the core member 143 of the bending and forming means 127 can be detected.

Below, processes for forming the food products 3 into a circular shape by using the apparatus 101 of the second embodiment of the inventions are explained based on FIGS. 17~24.

The "food products 3" in the second embodiment are the same as the "food products 3" explained in the first embodiment. Namely, the food products 3 in this embodiment are, for example, croissants, which are formed by rolling a food dough sheet that is cut so as to have a triangular shape from a base of the triangular so that the food dough have a linear shape.

Each of these croissants has an elongated shape and a thick diameter at its central portion.

The croissants are just illustrated by an example. Namely, the food products 3 are not limited to the croissants, but other suitable food products can be used as the food products 3.

First, behaviors of one of a plurality of the forming unit 110 disposed at the apparatus 101 of the second embodiment are explained.

Figure 17:
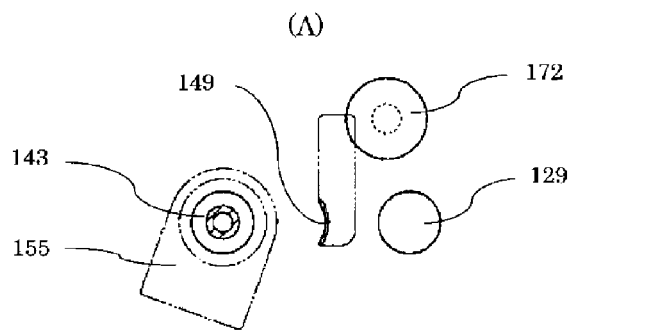
FIG. 17 is a set of explanatory drawings of a process for forming an elongated food product into a circular shape by using the apparatus of the second embodiment of the present inventions.
Figure 17:
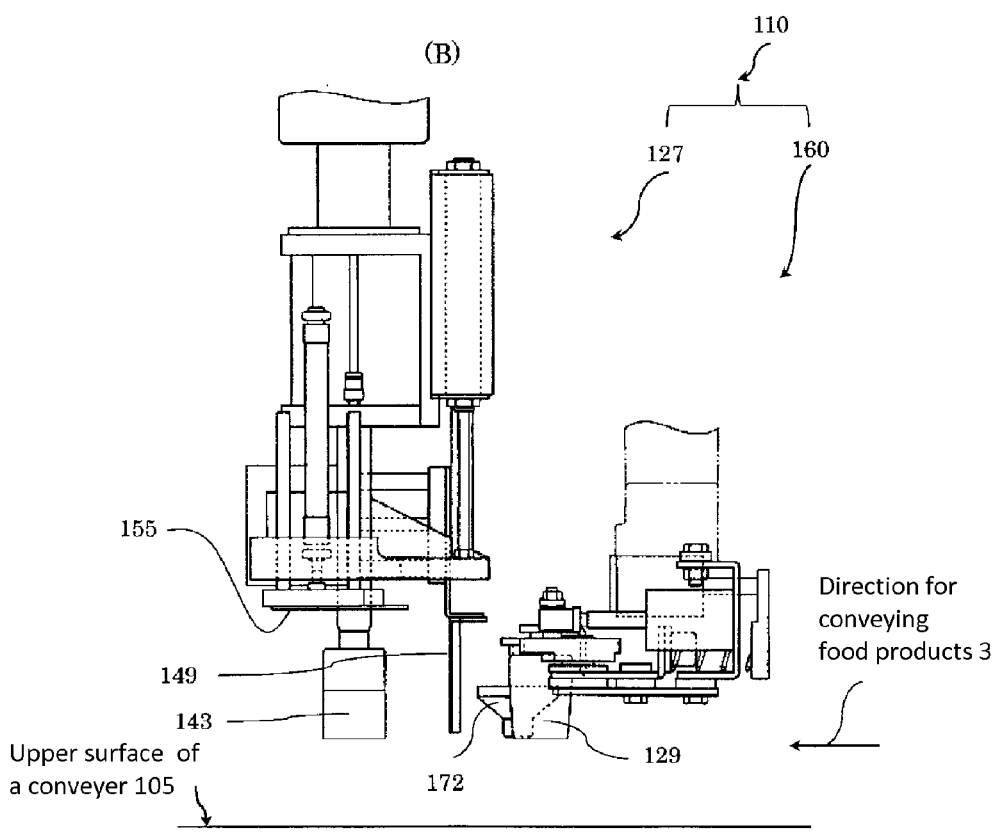
Figure 18:
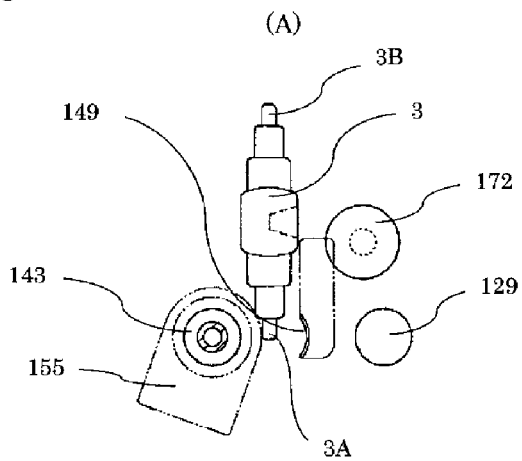
FIG. 18 is a set of explanatory drawings of a process for forming an elongated food product into a circular shape by using the apparatus of the second embodiment of the present inventions.
Figure 18:
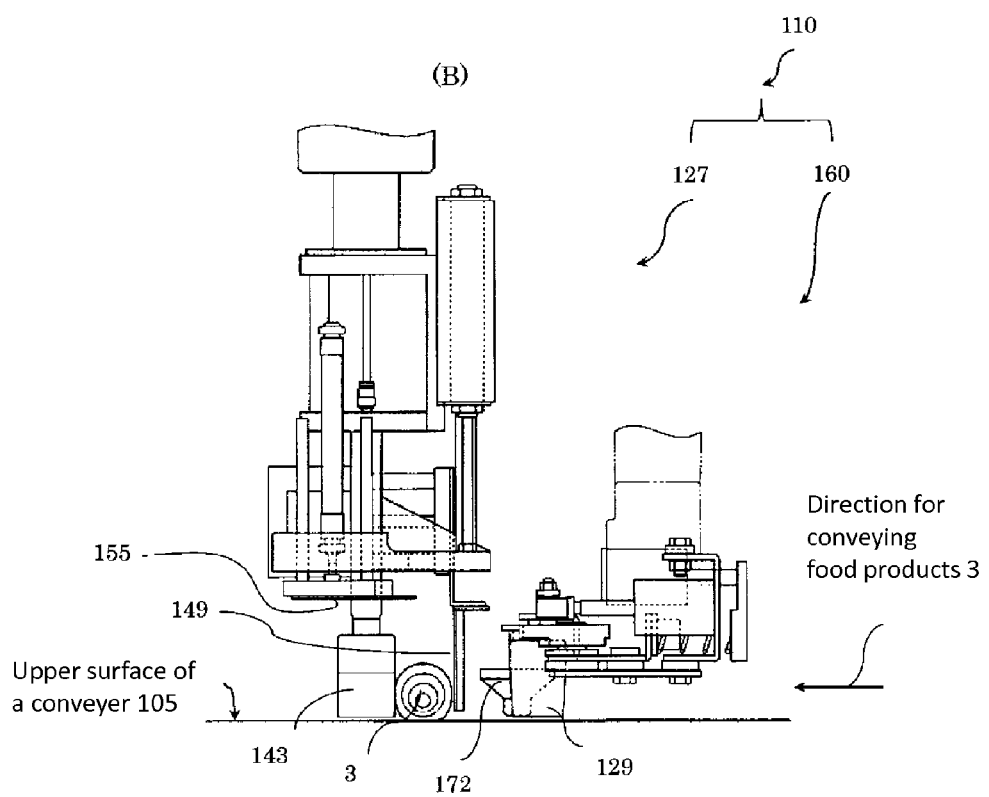

As shown in FIG. 17, at the initial position, the forming unit 110 comprising the bending and forming means 127 and the pressing roller unit 160 is waiting at the highest position above the upper surface of and at the most upstream side of the conveyer 105.

When the detecting module 157 disposed at the upstream side of the conveyer 105 detects the food products 3 that are conveyed on the conveyer 105, the forming unit 110 descends to near the upper surface of the conveyer based on the signals detected by the detecting module 157. (See FIG. 18.)

Then, the forming unit 110 is positioned in the direction that the food products 3 are conveyed so that one end 3A of the food product 3 positions between the core member 143 and the holding member 149 of the bending and forming means 127. (See the plane view of FIG. 18.)

After the forming unit 110 is positioned relative to the food product 3, the forming unit 110 moves toward the downstream of the conveyer 105 in synchronization with the speed of the food product 3. (Namely, the forming unit 110 moves at the same speed as that of the food product 3.)

Further, after the forming unit 110 is positioned relative to the food product 3, the holding member 149 of the bending and forming means 127 descends to near the upper surface of the conveyer 105, by lowering the third lifting and lowering member 183 by driving the third lifting and lowering device 182 of the bending and forming means 127. (See FIG. 18(B).)

Next, the holding member 149 moves close to the core member 143, and one end 3A of the food product 3 is pinched between the holding member 149 and the core member 143, by retracting the fourth reciprocating member 186 by driving the fourth reciprocating device 185 of the bending and forming means 127 (see FIG. 19(A)).

When one end 3A of the food product 3 is pinched between the holding member 149 and the core member 143, the rotational position of the bending and forming means 127 is controlled so as to be optimum (so that the part with a predetermined distance from one end 3A of the food product 3 can be pinched), based on the positional information of one end 3A of the food product 3 that is conveyed on the conveyer 105, wherein the positional information is detected by the detecting module 157 disposed at the upstream side of the conveyer 105, Next, the core member 143 and the holding member 149 of the bending and forming means 127 rotate together around the axis of the core member 143, while the core member 143 and the holding member 149 are pinching one end 3A of the food product 3. Consequently, the food product 3 is wound around the core member 143 (see FIGS. 19~21).

Then, the pressing roller 129 is controlled so as to move gradually apart from the core member 143 from the position close to it, and then move gradually close to the core member 143 by reciprocating the bracket 161 for supporting the pressing roller unit 160. The bracket 161 is reciprocated by driving the motor 193 based on the preliminarily programmed instructions stored in the control device 159.

Consequently, the distance between the outer surface of the pressing roller 129 and that of the core member 143 is controlled so that the outer surface of the pressing roller 129 moves along the surface of the outer side of the food product 3 being wound around the core member 143. Since the pressing roller 129 is fixed to the pressing roller unit 160 by means of the spring 164, when the pressing roller 129 moves so that the outer surface of the pressing roller 129 conforms to the surface of the outer side of the food product 3 being wound around the core member 143, the pressing roller 129 can press the food product 3 toward the core member 143 with a predetermined force generated by the spring 164, and is rotated because the outer surface of the pressing roller 129 contacts the surface of the outer side of the food product 3.

At the position that the bending and forming means 127 is rotated by 360 degrees, the pressing roller unit 160 reaches the closest position to the core member 143 (see FIG. 21), and the other end 3B of the food product 3 is overlapped on the outer surface of the holding member 149, while one end 3A of the food product 3 is being pinched between the core member 143 and the holding member 149. (See FIG. 21.)

After such a condition is achieved, one end 3A and the other end 3B of the food product 3 are directly overlapped by lifting up the holding member 149, by driving the third lifting and lowering device 182, and by retracting the third lifting and lowering member 183. (See FIG. 22.)

Next, the second reciprocating member 166 is retracted by driving the second reciprocating device 165. Consequently, the pressing roller 129 is strongly pressed toward the food product 3 since the force caused by the spring 164 is increased. (See FIG. 23.)

Then, one end 3A and the other end 3B of the food product 3 are adhered together, by rotating the bending and forming means 127 and, by moving the pressing roller 129 along the surface of the outer side of the food product 3.

While both ends of the food product 3 are being adhered, the pressing roller 129 is forcibly rotated so that the pressing roller 129 rolls over the surface of the outer side of the food product 3.

The rotation (the movement of the rolling over) of the pressing roller 129 is driven by the third reciprocating device 169, the third reciprocating member 171, and a pair of gears 167 and 168. When the third reciprocating device 169 is driven and the third reciprocating member 171 is retracted, the gear 167, which is connected with the distal end of the third reciprocating member 171, is rotated. Then, since the gear 168, which is engaged with the gear 167 and is fixed to the shaft of the pressing roller 129, is rotated, the pressing roller 129 is forcibly rotated. (See FIG. 23.)

Since the pressing roller 129 is forcibly rotated, the food product 3 can be rotated together with the core member 143. Further, since the pressing roller 129 can roll over the surface of the outer side of the food product 3 without slipping, stable forming processes of the food product 3 can be achieved.

Figure 19:
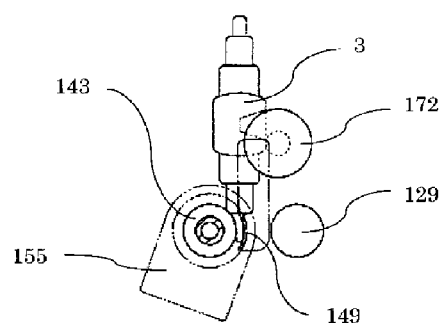
FIG. 19 is a set of explanatory drawings of a process for forming an elongated food product into a circular shape by using the apparatus of the second embodiment of the present inventions.
Figure 19:
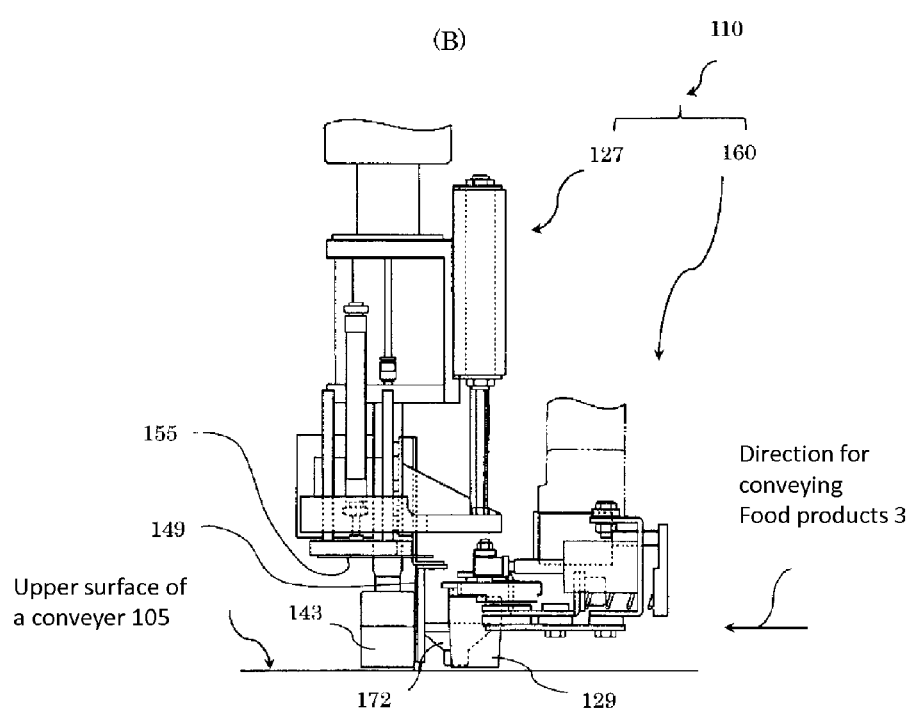
Figure 20:
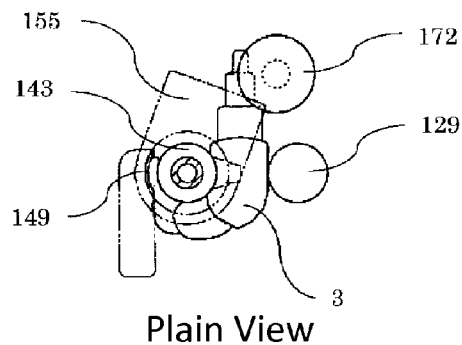
FIG. 20 is a set of explanatory drawings of a process for forming an elongated food product into a circular shape by using the apparatus of the second embodiment of the present inventions.
Figure 20:
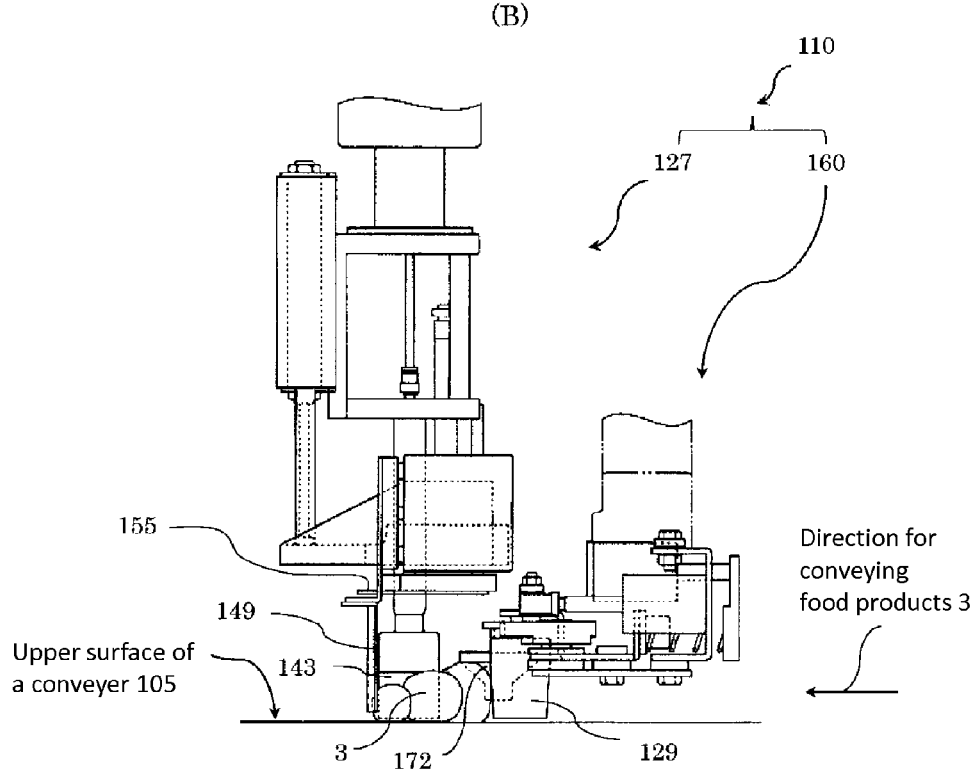
Figure 21:
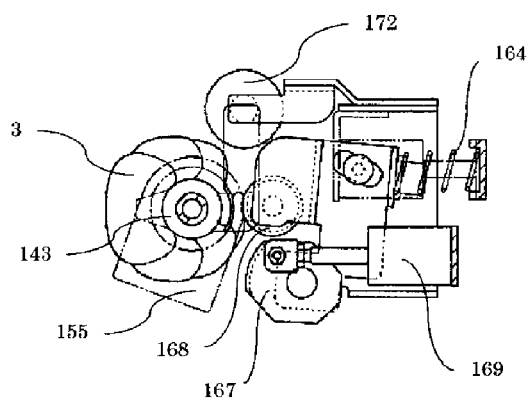
FIG. 21 is a set of explanatory drawings of a process for forming an elongated food product into a circular shape by using the apparatus of the second embodiment of the present inventions.
Figure 21:
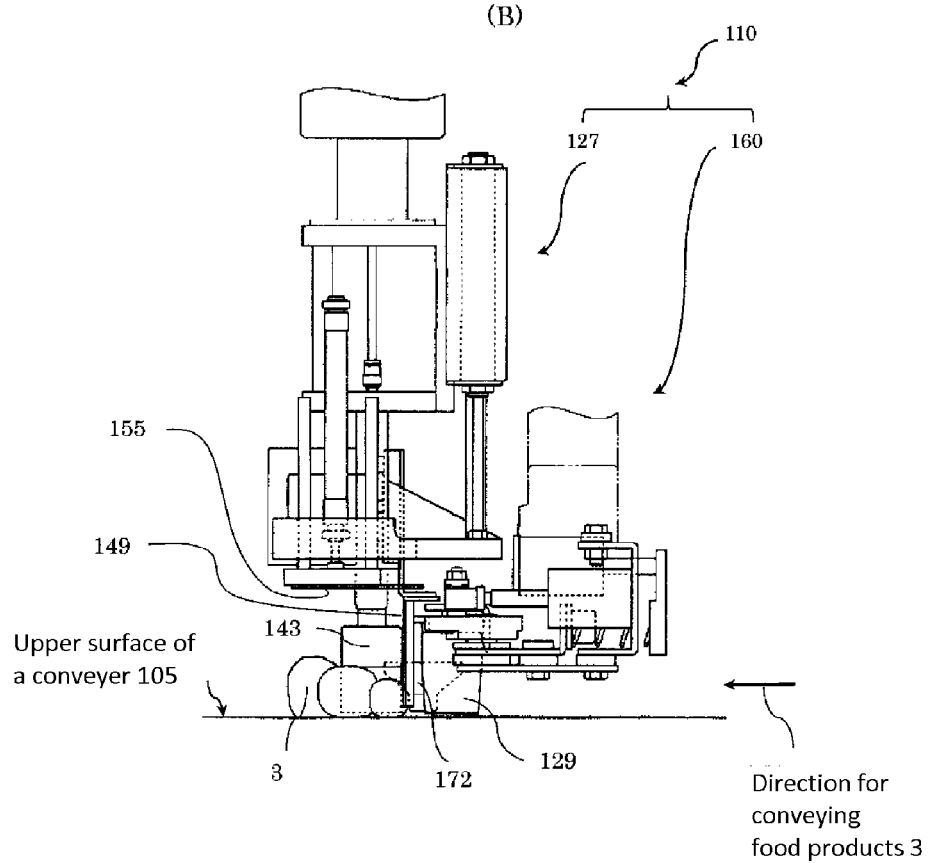
Figure 22:
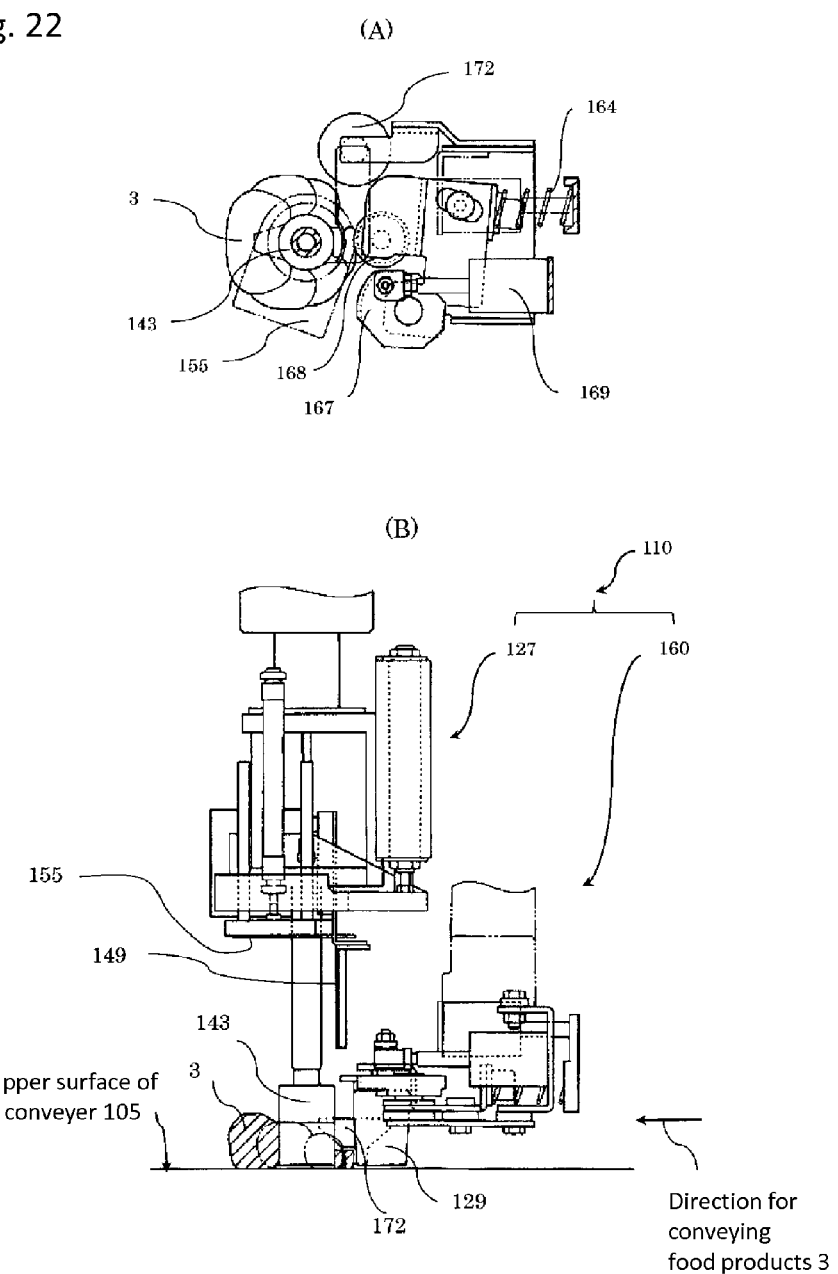
FIG. 22 is a set of explanatory drawings of a process for forming an elongated food product into a circular shape by using the apparatus of the second embodiment of the present inventions.
Figure 23:
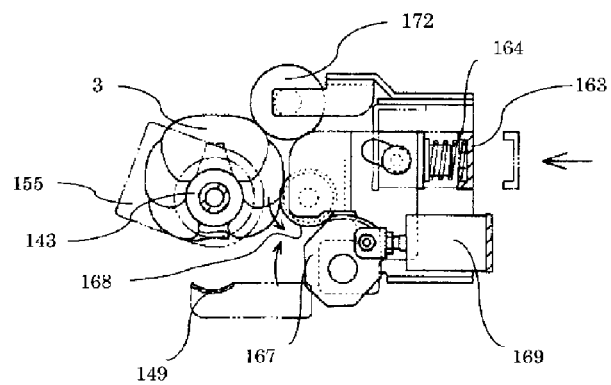
FIG. 23 is a set of explanatory drawings of a process for forming an elongated food product into a circular shape by using the apparatus of the second embodiment of the present inventions.
Figure 23:
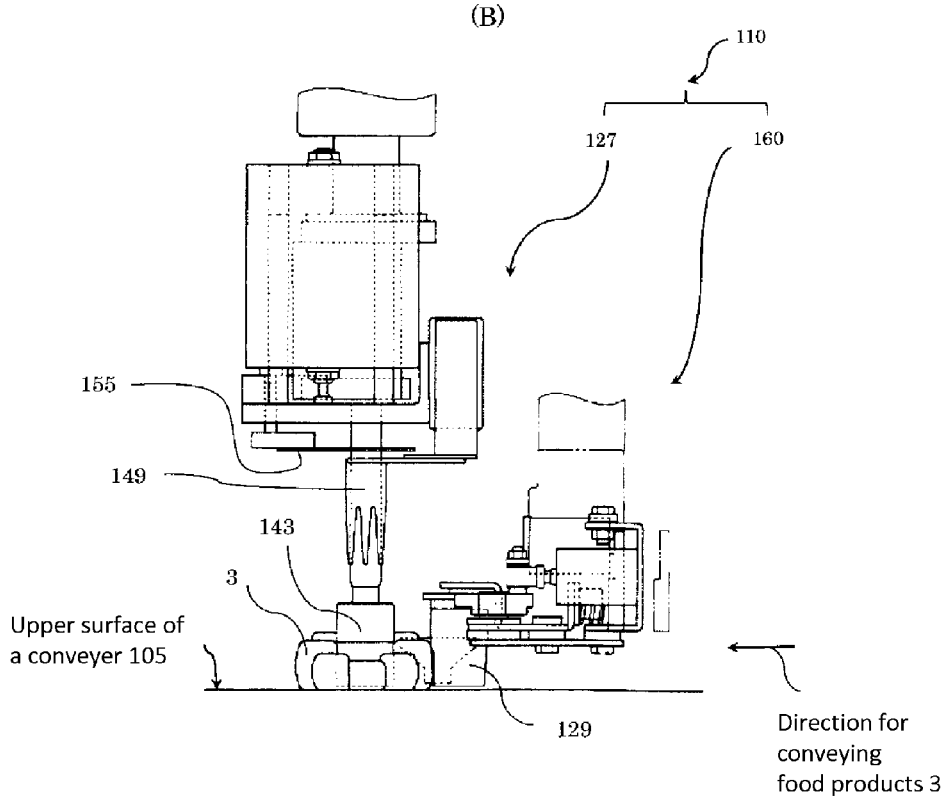
Figure 24:
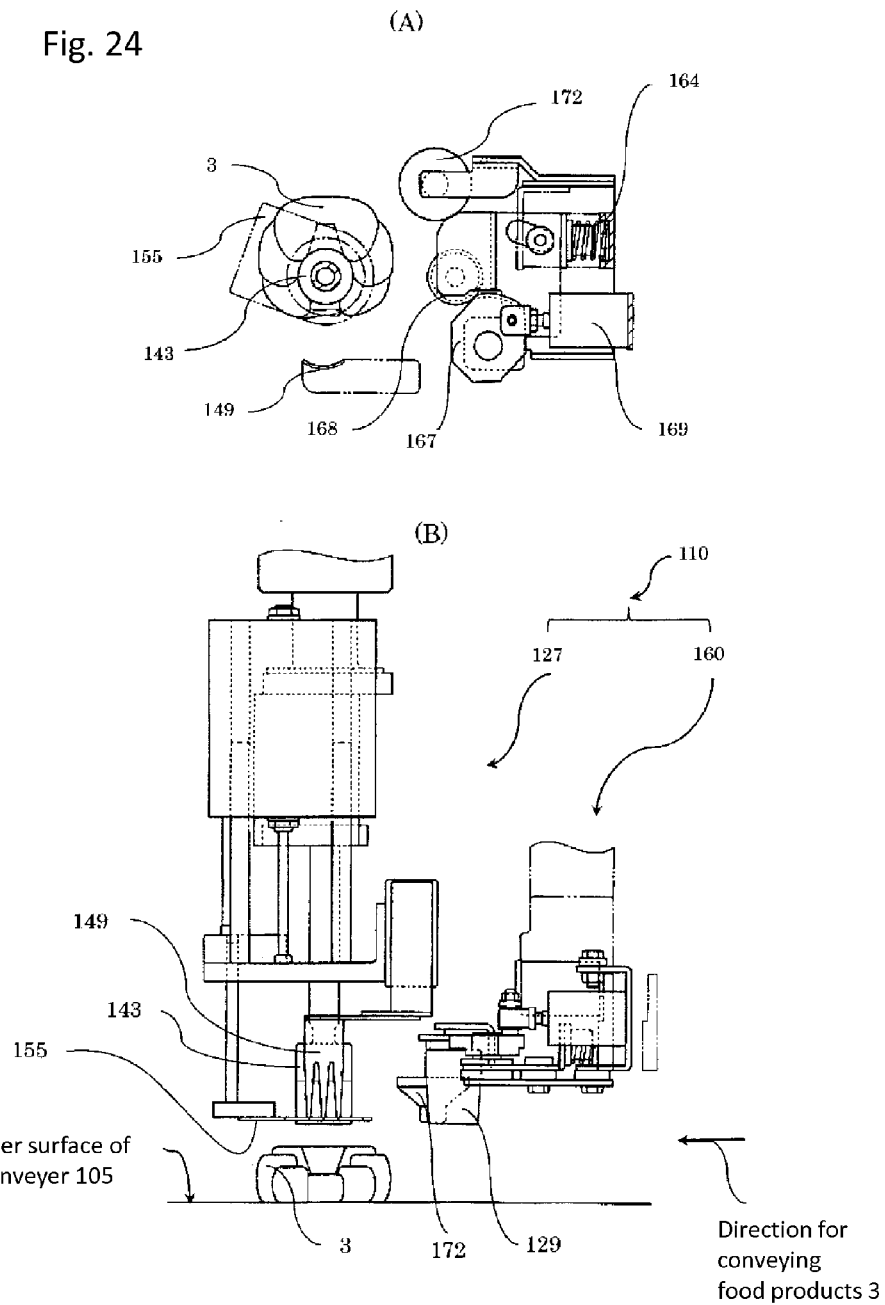
FIG. 24 is a set of explanatory drawings of a process for forming an elongated food product into a circular shape by using the apparatus of the second embodiment of the present inventions.

As shown in FIGS. 19 and 20, when the food product 3 is wound around the core member 143, while one end 3A of the food product 3 is being pinched between the pressing roller 129 and the core member 143, the holding roller 172 presses the food product 3 toward the upper surface of the conveyer 105, so that the other end 3B of the food product 3 is not lifted up. (See FIG. 19(A).) Since the spring 173 is disposed on the upper part of the holding roller 172, and since a downward force is applied to the holding roller 172, the holding roller 172 can prevent the other side 3B of the food product 3 from being lifted up. (See FIG. 16-3.)

After adhering one end 3A and the other end 3B of the food product 3, and forming the food product 3 into a shape being closed into a circular shape, the forming unit 110, that is, the bending and forming means 127 and the pressing roller unit 160, integrally ascends. Simultaneously, the dropping member 155 is lowered downward by driving the fourth lifting and lowering device 187 and by extending the fourth lifting and lowering member 188. Consequently, the food product 3 that is wound around the core member 143 and is formed into a circular shape is separated from the core member 143. (See FIG. 24.)

Then, as explained before, the compressed air is supplied with the core member 143, and the core member 143 may eject the compressed air from its outer periphery. By this process, the food product 3 may easily be separated from the core member 143 even if the food product 3 is adhered to the core member 143.

After separating the food product 3 formed into a circular shape from the core member 143, while maintaining the forming unit 110 at the position where it is lifted up, the forming unit 110 moves toward the upstream in the direction that the food product 3 is conveyed and returns to the initial position, and then one cycle for forming the food product 3 into a circular shape is completed.

Regarding the apparatus 101 of the second embodiment of the inventions, as explained in the above paragraphs, since the apparatus 101 has eighteen (18) sets of the forming units 110 (three (3) sets of the forming units 110 placed in a row, which corresponds to the direction that the food products are conveyed, and six (6) sets of the forming units 110 placed in a column, which corresponds to the perpendicular to the direction that the food products are conveyed), eighteen (18) of the food products 3 are formed into a circular shape at the same time in one cycle.

In the above paragraphs, it is exemplified that one end 3A and the other end 3B of the food product 3 are overlapped and adhered. However, the present inventions are not limited to such a configuration. It is possible to form the food product 3 into a shape such that one end 3A and the other end 3B of the food product 3 are faced each other so as to form a C-shape.

As explained in the above paragraphs, when the food product 3 having an elongated shape is formed into a circular shape or into a C-shape, one end 3A of the food product 3 is fixed to the core member 143, and the core member 143 is rotated to wind the food product 3 around the core member 143. At the same time as winding the food product 3 around the core member 143, the food product 3 is pressed toward the core member 143 by moving the pressing roller 129 so as to come close to the core member 143.

Namely, the elongated food product 3 is formed into a circular shape by continuously winding it around the core member 143 from one end 3A to the other side 3B of it.

Further, since the apparatus 101 of the second embodiment of the inventions has eighteen (18) sets of the forming units 110, which form the food products 3 into a circular shape, the forming process of a large number of the food products 3 can be efficiently implemented. Thus, the productivity of the formed food products 3 can be improved.

The apparatus 101 of the second embodiment of the inventions can be changed and improved in various ways. For example, in the apparatus 101 explained in the above paragraphs, while the food product 3 is being formed into a circular shape, the conveyer 105 is operating. However, while the food product 3 is being formed into a circular shape, the conveyer 105 can be stopped. Further, it is explained in the above paragraphs that the apparatus 101 has eighteen (18) sets of the forming units 110. However, the apparatus 101 may have one set of the forming unit 110, or may have a plurality of the forming units 110 other than eighteen (18) sets.

EXPLANATIONS OF DENOTATIONS 1, 101 an apparatus (for forming food products into a circular shape)
3 a food product (food dough)
3A one end (of a food product)
3B the other end (of a food product)
3C a central portion (of a food product)
5, 105 a conveyer
7 a formed food product
9 a carrying-out conveyer
11 a tray
13 a means for forming and carrying food products
23 a third arm
25 a rotating arm
27, 127 a bending and forming means
29, 129 a pressing roller
35 a baseplate 39 a first reciprocating device
41, 141 a supporting shaft
43, 143 a core member
47 a first lifting and lowering device
49, 149 a holding member
51 a second lifting and lowering device
55, 155 a dropping member
57 an imaging module
110 a forming unit
157 a detecting module
160 a pressing roller unit
164, 173 a spring
165 a second reciprocating device
167, 168 a gear
169 a third reciprocating device
172 a holding roller
182 a third lifting and lowering device
185 a fourth reciprocating device
187 a fourth lifting and lowering device
190 a supporting structure unit
191 lower side plates
192 upper side plates
194 a supporting structure (for supporting the pressing roller unit)
195 a rotational driving device (to rotate the bending and forming means)
200 a driving device (to drive the supporting structure unit)

What we claim is:

1. A method for forming a food product into a circular shape, wherein both ends of an elongated food product are connected each other and closed, or into a C-shape, wherein both ends of the elongated food product face each other and opened, the method comprising:
   (a) fixing one end of the elongated food product to a rotatable core member;
   (b) pressing the food product toward the core member by moving the core member close to and away from a pressing roller, when the food product is formed into a circular shape by being wound around the core member by rotating the core member; and
   (c) separating the formed food product and the core member by releasing the food product from the core member, after forming the food product into a required shape by being wound around the core member.

2. The method according to claim 1,
wherein the step of separating the formed food product from the core member further comprising:
blowing air between the surface of the inner side of the food product and the outer surface of the core member.

3. A method for forming a food product into a circular shape, wherein both ends of an elongated food product are connected each other and closed, or into a C-shape, wherein both ends of the elongated food product face each other and opened, the method comprising:
   (a) fixing one end of the elongated food product to a rotatable core member;
   (b) pressing the food product toward the core member by moving a pressing roller close to and away from the core member, when the food product is formed into a circular shape by being wound around the core member by rotating the core member; and
   (c) separating the formed food product and the core member by releasing the food product from the core member, after forming the food product into a required shape by being wound around the core member.

4. The method according to claim 1, further comprising:
overlapping both ends of the food product to connect both ends and to close the food product into a circular shape; and
adhering the overlapped both ends of the food product by pressing the overlapped both ends of the food product with the core member and the pressing roller.

5. An apparatus for forming a food product into a circular shape, wherein both ends of an elongated food product are connected each other and closed, or into a C-shape, wherein both ends of the elongated food product face each other and opened, wherein the apparatus comprising:
   a rotatable core member having a fixing means for fixing one end of the elongated food product to the outer surface of the core member; and
   a pressing roller for pressing the food product toward the core member by moving the core member close to and away from the pressing roller, when the food product is formed into a circular shape by being wound around the core member by rotating the core member.

6. The apparatus according to claim 5,
wherein the pressing roller is disposed above and close to a conveyer that conveys the food products in lines.

7. An apparatus for forming a food product into a circular shape, wherein both ends of an elongated food product are connected each other and closed, or into a C-shape, wherein both ends of the elongated food product face each other and opened, wherein the apparatus comprising:
   a rotatable core member having a fixing means for fixing one end of the elongated food product to the part of the outer surface of the core member; and
   a pressing roller for pressing the food product toward the core member by moving the pressing roller close to and away from the core member, when the food product is formed into a circular shape by being wound around the core member by rotating the core member.

8. The apparatus according to claim 5,
wherein the fixing means has a holding member that can press one end of the food product toward the core member and ascend and descend relative to the core member.

9. The apparatus according to claim 5, further comprising:
a means for ejecting air between the surface of the inner side of the food product and the outer surface of the core member, when the formed food product is separated from the core member.

10. The apparatus according to claim 7,
wherein the pressing roller is forcibly rotated, when the food product is formed into a circular shape by being wound around the core member, and by being pressed toward the core member with the pressing roller.

11. The apparatus according to claim 7, further comprising:
a holding roller for preventing the food product from being lifted, when the food product is formed into a circular shape by being wound around the core member and by being pressed toward the core member with the pressing roller.

* * * * *